United States Patent
Dong et al.

(10) Patent No.: US 11,552,841 B2
(45) Date of Patent: *Jan. 10, 2023

(54) METHOD AND APPARATUS FOR CONFIGURING SERVICE

(71) Applicant: Huawei Technologies Co., Ltd., Shenzhen (CN)

(72) Inventors: Wenxia Dong, Beijing (CN); Enhui Liu, Shenzhen (CN); Chengyong Lin, Shenzhen (CN); Fengkai Li, Beijing (CN); Wanfu Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,416

(22) Filed: Oct. 4, 2021

(65) Prior Publication Data

US 2022/0029879 A1    Jan. 27, 2022

Related U.S. Application Data

(63) Continuation of application No. 17/094,536, filed on Nov. 10, 2020, now Pat. No. 11,196,620, which is a
(Continued)

(30) Foreign Application Priority Data

Sep. 5, 2014   (CN) .......................... 201410453604.1

(51) Int. Cl.
*H04L 41/08* (2022.01)
*H04L 41/5054* (2022.01)
(Continued)

(52) U.S. Cl.
CPC .............. *H04L 41/08* (2013.01); *H04L 41/00* (2013.01); *H04L 41/0893* (2013.01);
(Continued)

(58) Field of Classification Search
CPC ......... H04L 41/08; H04L 29/08; H04L 41/00; H04L 41/0893; H04L 41/20; H04L 41/5019; H04L 41/5054
See application file for complete search history.

(56) References Cited

U.S. PATENT DOCUMENTS 8,249,615 B2    8/2012  Shaw et al.
9,106,516 B1    8/2015  Palmans et al.
(Continued)

FOREIGN PATENT DOCUMENTS

| CN | 103051629 A | 4/2013 |
| CN | 103281715 A | 9/2013 |

(Continued)

OTHER PUBLICATIONS

"Focus Group Cloud Technical Report," ITU-T Focus Group on Cloud Computing Technical Report, Parts 1-7, pp. 1-273, International Telecommunication Union, Geneva, Switzerland (Feb. 2012).
(Continued)

*Primary Examiner* — Viet D Vu

(74) *Attorney, Agent, or Firm* — Leydig, Voit & Mayer, Ltd.

(57) ABSTRACT

This application provides a method and an apparatus for configuring a service, which help to implement automatic configuration of a service and improve efficiency. The method provided in this application includes: obtaining, by an NaaS device, a contract of a service, where the contract includes identifier information and a condition, the identifier information is used to identify a first device group, the first device group includes a device that provides the service, and the condition is a communication requirement corresponding to the service; obtaining, by the NaaS device, information about a network device group according to the identifier information and the condition; obtaining, by the NaaS device, a first forwarding rule according to the condition,
(Continued)

where the first forwarding rule corresponds to the network device group; and sending, by the NaaS device, the first forwarding rule and the information about the network device group to a controller.

18 Claims, 6 Drawing Sheets

Related U.S. Application Data continuation of application No. 15/449,603, filed on Mar. 3, 2017, now Pat. No. 10,855,524, which is a continuation of application No. PCT/CN2015/087578, filed on Aug. 20, 2015.

(51) Int. Cl.
    *H04L 41/00*        (2022.01)
    *H04L 41/0893*   (2022.01)
    *H04L 41/5019*   (2022.01)
    *H04L 65/40*     (2022.01)

(52) U.S. Cl.
    CPC .......... *H04L 41/20* (2013.01); *H04L 41/5019* (2013.01); *H04L 41/5054* (2013.01); *H04L 65/40* (2013.01)

(56) References Cited

U.S. PATENT DOCUMENTS

| | | | |
|---|---|---|---|
| 2005/0172015 A1 | 8/2005 | Rana et al. | |
| 2005/0180433 A1 | 8/2005 | Jouenne et al. | |
| 2010/0309907 A1* | 12/2010 | Proulx ................ | H04L 41/0893 370/389 |
| 2011/0047290 A1 | 2/2011 | Levett | |
| 2012/0331524 A1 | 12/2012 | Mower et al. | |
| 2013/0046874 A1 | 2/2013 | Cohn et al. | |
| 2013/0159062 A1 | 6/2013 | Stiehl | |
| 2013/0166703 A1 | 6/2013 | Hammer et al. | |
| 2013/0227670 A1 | 8/2013 | Ahmad et al. | |
| 2014/0130046 A1 | 5/2014 | Okuno et al. | |
| 2014/0269724 A1* | 9/2014 | Mehler ................... | H04L 45/30 370/392 |
| 2015/0052247 A1 | 2/2015 | Threefoot et al. | |
| 2015/0103824 A1 | 4/2015 | Tanabe et al. | |
| 2015/0334032 A1 | 11/2015 | Aida et al. | |
| 2015/0381775 A1 | 12/2015 | Ashida | |
| 2016/0134472 A1 | 5/2016 | Guan et al. | |
| 2016/0164963 A1 | 6/2016 | Ganguli et al. | |

FOREIGN PATENT DOCUMENTS

| | | |
|---|---|---|
| CN | 103491129 A | 1/2014 |
| CN | 103634177 A | 3/2014 |
| EP | 2466510 A1 | 6/2012 |
| JP | 2003134128 A | 5/2003 |
| JP | 2006067054 A | 3/2006 |
| JP | 2013055642 A | 3/2013 |
| JP | 2013239867 A | 11/2013 |
| JP | 2014096675 A | 5/2014 |
| JP | 2014157617 A | 8/2014 |
| WO | 2013133355 A1 | 9/2013 |
| WO | 2013168737 A1 | 11/2013 |
| WO | 2014104277 A1 | 7/2014 |
| WO | 2014118938 A1 | 8/2014 |

OTHER PUBLICATIONS

Mestery, "Group-based Policy Abstractions for Neutron," Blueprints Neutron (Oct. 4, 2013).
"Neutron" Openstack Wiki, pp. 1-10, (Downloaded Aug. 17, 2017).
Zhang et al., "An SDN Architecture for Cloud Network Service," 2013 annual meeting of information and communication network technology committee of China Communication Society, pp. 118-120 (Aug. 22, 2013). With English Abstract.

* cited by examiner

METHOD AND APPARATUS FOR CONFIGURING SERVICE

CROSS-REFERENCE TO RELATED APPLICATIONS

This application is a continuation of U.S. patent application Ser. No. 17/094,536, filed on Nov. 10, 2020, now U.S. Pat. No. 11,196,620, which is a continuation of U.S. patent application Ser. No. 15/449,603, filed on Mar. 3, 2017, now is U.S. Pat. No. 10,855,524, which is a continuation of International Application No. PCT/CN2015/087578, filed on Aug. 20, 2015, which claims priority to Chinese Patent Application No. 201410453604.1, filed on Sep. 5, 2014. All of the aforementioned patent applications are hereby incorporated by reference in their entireties.

TECHNICAL FIELD

The present application relates to the field of communications technologies, and specifically, to a method and an apparatus for configuring a service.

BACKGROUND

A software-defined networking (SDN) is a new-type network architecture, and may be roughly divided into the following three layers: an upper-layer application, such as a cloud (cloud) or an over-the-top (OTT); an intermediate-layer controller (Controller); and a bottom-layer physical network device, such as a switch or a router.

Currently, when a bottom-layer physical network device for implementing a specific service is configured for an upper-layer application, network management personnel need to obtain a service involved in the upper-layer application and a service requirement, and further need to obtain functions that can be implemented by physical network devices. The network management personnel may select, according to the functions that can be implemented by the physical network devices, a physical network device matching the service requirement. The network management personnel configure the service for the selected physical network device. In this way, service configuration for a network device is relatively complex, and work efficiency is relatively low. If upper-layer applications have more types and enhanced functions, service configuration for a network device becomes more complex, and work efficiency is reduced.

SUMMARY

A method and an apparatus for configuring a service that are provided in embodiments of the present application help to implement automatic configuration of a service and improve efficiency.

Therefore, the following technical solutions are provided in the embodiments of the present application:

According to a first aspect, a method for configuring a service is provided, including:

obtaining, by an NaaS device, a contract of a service, where the contract includes identifier information and a condition, the identifier information is used to identify a first device group, the first device group includes a device that provides the service, and the condition is a communication requirement corresponding to the service;

obtaining, by the NaaS device, information about a network device group according to the identifier information and the condition;

obtaining, by the NaaS device, a first forwarding rule according to the condition, where the first forwarding rule corresponds to the network device group; and sending, by the NaaS device, the first forwarding rule and the information about the network device group to a controller.

In a first possible implementation manner of the first aspect, the identifier information is a first identifier, the condition is a communication requirement for accessing a device group identified by the first identifier, and the obtaining, by the NaaS device, information about a network device group according to the identifier information and the condition includes:

obtaining, by the NaaS device, a second device group corresponding to the first identifier, where the second device group includes a first device, and the first device is a device that meets the communication requirement;

selecting, by the NaaS device, the first device from the second device group according to the communication requirement for accessing the device group identified by the first identifier; and obtaining, by the NaaS device, information about the first device, where the information about the first device includes an identifier of the first device and an interface of the first device.

With reference to the first possible implementation manner of the first aspect, a second possible implementation manner of the first aspect is further provided, where the obtaining, by the NaaS device, a first forwarding rule according to the condition includes:

obtaining, by the NaaS device, a first match field and a first action from the condition, where the first match field corresponds to the communication requirement for accessing the device group identified by the first identifier, and the first action corresponds to an access operation; and generating, by the NaaS device, a forwarding rule of the first device according to the first match field and the first action.

With reference to the second possible implementation manner of the first aspect, a third possible implementation manner of the first aspect is further provided, where the obtaining, by the NaaS device, a first forwarding rule according to the condition further includes:

performing, by the NaaS device, a conflict check on the forwarding rule of the first device and a second forwarding rule, where the second forwarding rule is a forwarding rule that is already configured on the first device; and if the forwarding rule of the first device conflicts with the second forwarding rule, obtaining, by the NaaS device, a calibrated forwarding rule of the first device.

With reference to the second or the third possible implementation manner of the first aspect, a fourth possible implementation manner of the first aspect is further provided, where the obtaining, by the NaaS device, a first forwarding rule according to the condition further includes:

determining, by the NaaS device, whether the forwarding rule of the first device and a forwarding rule of a second device in the second device group form a transmission abnormality; and if the forwarding rule of the first device and the forwarding rule of the second device in the second device group form a transmission abnormality, obtaining, by the NaaS device, a third forwarding rule, where the third forwarding rule is a calibrated forwarding rule of the second device.

In a fifth possible implementation manner of the first aspect, the identifier information includes a second identifier and a third identifier, the condition is a requirement on communication between a device group identified by the second identifier and a device group identified by the third identifier, and the obtaining, by the NaaS device, information about a network device group according to the identifier information and the condition includes:

obtaining, by the NaaS device, a third device group corresponding to the second identifier and a fourth device group corresponding to the third identifier, where the third device group includes a device used as a source node, and the fourth device group includes a device used as a destination node;

selecting, by the NaaS device, a third device from the third device group according to the requirement on communication between the device group identified by the second identifier and the device group identified by the third identifier, where the third device is the source node;

selecting, by the NaaS device, a fourth device from the fourth device group according to the requirement on communication between the device group identified by the second identifier and the device group identified by the third identifier, where the fourth device is the destination node;

obtaining, by the NaaS device, information about the third device and information about the fourth device, where the information about the third device includes an identifier of the third device and an interface of the third device, and the information about the fourth device includes an identifier of the fourth device and an interface of the fourth device.

With reference to the fifth possible implementation manner of the first aspect, a sixth possible implementation manner of the first aspect is further provided, where the obtaining, by the NaaS device, a first forwarding rule according to the condition includes:

obtaining, by the NaaS device, a second match field and a second action from the condition, where the second match field corresponds to the requirement on communication between the device group identified by the second identifier and the device group identified by the third identifier, and the second action corresponds to communication between the device group identified by the second identifier and the device group identified by the third identifier; and generating, by the NaaS device, a forwarding rule of the third device and a forwarding rule of the fourth device according to the second match field and the second action.

With reference to the sixth possible implementation manner of the first aspect, a seventh possible implementation manner of the first aspect is further provided, where the obtaining, by the NaaS device, a first forwarding rule according to the condition further includes:

performing, by the NaaS device, a conflict check on the forwarding rule of the third device and a fourth forwarding rule, where the fourth forwarding rule is a forwarding rule that is already configured on the third device; and if the forwarding rule of the third device conflicts with the fourth forwarding rule, obtaining, by the NaaS device, a calibrated forwarding rule of the third device.

With reference to the sixth or the seventh possible implementation manner of the first aspect, an eighth possible implementation manner of the first aspect is further provided, where the obtaining, by the NaaS device, a first forwarding rule according to the condition further includes:

performing, by the NaaS device, a conflict check on the forwarding rule of the fourth device and a fifth forwarding rule, where the fifth forwarding rule is a forwarding rule that is already configured on the fourth device; and if the forwarding rule of the fourth device conflicts with the fifth forwarding rule, obtaining, by the NaaS device, a calibrated forwarding rule of the fourth device.

With reference to any one of the sixth to the eighth possible implementation manners of the first aspect, a ninth possible implementation manner of the first aspect is further provided, where the obtaining, by the NaaS device, a first forwarding rule according to the condition further includes:

determining, by the NaaS device, whether the forwarding rule of the third device and a forwarding rule of a fifth device in the third device group form a transmission abnormality; and if the forwarding rule of the third device and the forwarding rule of the fifth device in the third device group form a transmission abnormality, obtaining, by the NaaS device, a sixth forwarding rule, where the sixth forwarding rule is a calibrated forwarding rule of the fifth device.

With reference to any one of the sixth to the ninth possible implementation manners of the first aspect, a tenth possible implementation manner of the first aspect is further provided, where the obtaining, by the NaaS device, a first forwarding rule according to the condition further includes:

determining, the NaaS device, whether the forwarding rule of the fourth device and a forwarding rule of a sixth device in the fourth device group form a transmission abnormality; and if the forwarding rule of the fourth device and the forwarding rule of the sixth device in the fourth device group form a transmission abnormality, obtaining, by the NaaS device, a seventh forwarding rule, where the seventh forwarding rule is a calibrated forwarding rule of the sixth device.

In an eleventh possible implementation manner of the first aspect, the identifier information is a fourth identifier and a fifth identifier, the condition is a communication requirement for a device group identified by the fourth identifier to join a multicast group identified by the fifth identifier, and the obtaining, by the NaaS device, information about a network device group according to the identifier information and the condition includes:

obtaining, by the NaaS device, a fifth device group corresponding to the fourth identifier, where the fifth device group includes a device that communicates with a device identified by the fourth identifier;

selecting, by the NaaS device, a seventh device from the fifth device group according to the communication requirement for the device group identified by the fourth identifier to join the multicast group identified by the fifth identifier, where the seventh device communicates with the device group identified by the fourth identifier; and obtaining, by the NaaS device, information about the seventh device, where the information about the seventh device includes an identifier of the seventh device and an interface of the seventh device.

With reference to the eleventh possible implementation manner of the first aspect, a twelfth possible implementation manner of the first aspect is further provided, where the obtaining, by the NaaS device, a first forwarding rule according to the condition includes:

obtaining, by the NaaS device, a third match field and a third action from the condition, where the third match field corresponds to the communication requirement for the device group identified by the fourth identifier to join the multicast group identified by the fifth identifier, and the third action corresponds to a multicast operation; and generating, by the NaaS device, a forwarding rule of the seventh device according to the third match field and the third action.

With reference to the twelfth possible implementation manner of the first aspect, a thirteenth possible implementation manner of the first aspect is further provided, where the obtaining, by the NaaS device, a first forwarding rule according to the condition further includes:

performing, by the NaaS device, a conflict check on the forwarding rule of the seventh device and an eighth forwarding rule, where the eighth forwarding rule is a forwarding rule that is already configured on the seventh device; and if the forwarding rule of the seventh device conflicts with the eighth forwarding rule, obtaining, by the NaaS device, a calibrated forwarding rule of the seventh device.

With reference to the twelfth or the thirteenth possible implementation manner of the first aspect, a fourteenth possible implementation manner of the first aspect is further provided, where the obtaining a first forwarding rule further includes:

determining, by the NaaS device, whether the forwarding rule of the seventh device and a forwarding rule of an eighth device in the fifth device group form a transmission abnormality; and if a transmission abnormality is formed, obtaining, by the NaaS device, a ninth forwarding rule, where the ninth forwarding rule is a calibrated forwarding rule of the eighth device.

With reference to any one of the first aspect or any possible implementation manner of the first aspect, a fifteenth possible implementation manner of the first aspect is further provided, where the method further includes:

obtaining, by the NaaS device, a detection packet according to the first forwarding rule and the information about the network device group, where the detection packet is used to obtain a detection result from the network device group, and the detection result is a result obtained by detecting communication that is performed by the network device group according to the first forwarding rule;

sending, by the NaaS device, the detection packet to the controller;

receiving, by the NaaS device, the detection result sent by the controller; and if the detection result meets a preset condition, adjusting, by the NaaS device, the contract according to the detection result.

In a sixteenth possible implementation manner of the first aspect, the contract further includes a type of the service, and the type of the service is access, routing, or multicast.

According to a second aspect, an apparatus for configuring a service is provided, including:

a contract obtaining unit, configured to obtain a contract of a service, where the contract includes identifier information and a condition, the identifier information is used to identify a first device group, the first device group includes a device that provides the service, and the condition is a communication requirement corresponding to the service;

a network device group obtaining unit, configured to obtain information about a network device group according to the identifier information and the condition;

a rule obtaining unit, configured to obtain a first forwarding rule according to the condition, where the first forwarding rule corresponds to the network device group; and a first sending unit, configured to send the first forwarding rule and the information about the network device group to a controller.

In a first possible implementation manner of the second aspect, the identifier information is a first identifier, and the condition is a communication requirement for accessing a device group identified by the first identifier;

the network device group obtaining unit is specifically configured to obtain a second device group corresponding to the first identifier, where the second device group includes a first device, and the first device is a device that meets the communication requirement;

the network device group obtaining unit is specifically configured to select the first device from the second device group according to the communication requirement for accessing the device group identified by the first identifier; and the network device group obtaining unit is specifically configured to obtain information about the first device, where the information about the first device includes an identifier of the first device and an interface of the first device.

With reference to the first possible implementation manner of the second aspect, a second possible implementation manner of the second aspect is further provided, where the rule obtaining unit is specifically configured to obtain a first match field and a first action from the condition, where the first match field corresponds to the communication requirement for accessing the device group identified by the first identifier, and the first action corresponds to an access operation; and the rule obtaining unit is specifically configured to generate a forwarding rule of the first device according to the first match field and the first action.

With reference to the second possible implementation manner of the second aspect, a third possible implementation manner of the second aspect is further provided, where the rule obtaining unit is further configured to perform a conflict check on the forwarding rule of the first device and a second forwarding rule, where the second forwarding rule is a forwarding rule that is already configured on the first device; and if the forwarding rule of the first device conflicts with the second forwarding rule, the rule obtaining unit is configured to obtain a calibrated forwarding rule of the first device.

With reference to the second or the third possible implementation manner of the second aspect, a fourth possible implementation manner of the second aspect is further provided, where the rule obtaining unit is further configured to determine whether the forwarding rule of the first device and a forwarding rule of a second device in the second device group form a transmission abnormality; and if the forwarding rule of the first device and the forwarding rule of the second device in the second device group form a transmission abnormality, the rule obtaining unit is configured to obtain a third forwarding rule, where the third forwarding rule is a calibrated forwarding rule of the second device.

In a fifth possible implementation manner of the second aspect, the identifier information includes a second identifier and a third identifier, and the condition is a requirement on communication between a device group identified by the second identifier and a device group identified by the third identifier;

the network device group obtaining unit is specifically configured to obtain a third device group corresponding to the second identifier and a fourth device group corresponding to the third identifier, where the third device group includes a device used as a source node, and the fourth device group includes a device used as a destination node;

the network device group obtaining unit is specifically configured to select a third device from the third device group according to the requirement on communication between the device group identified by the second identifier and the device group identified by the third identifier, where the third device is the source node;

the network device group obtaining unit is specifically configured to select a fourth device from the fourth device group according to the requirement on communication between the device group identified by the second identifier and the device group identified by the third identifier, where the fourth device is the destination node; and the network device group obtaining unit is specifically configured to obtain information about the third device and information about the fourth device, where the information about the third device includes an identifier of the third device and an interface of the third device, and the information about the fourth device includes an identifier of the fourth device and an interface of the fourth device.

With reference to the fifth possible implementation manner of the second aspect, a sixth possible implementation manner of the second aspect is further provided, where the rule obtaining unit is specifically configured to obtain a second match field and a second action from the condition, where the second match field corresponds to the requirement on communication between the device group identified by the second identifier and the device group identified by the third identifier, and the second action corresponds to communication between the device group identified by the second identifier and the device group identified by the third identifier; and the rule obtaining unit is specifically configured to generate a forwarding rule of the third device and a forwarding rule of the fourth device according to the second match field and the second action.

With reference to the sixth possible implementation manner of the second aspect, a seventh possible implementation manner of the second aspect is further provided, where the rule obtaining unit is further configured to perform a conflict check on the forwarding rule of the third device and a fourth forwarding rule, where the fourth forwarding rule is a forwarding rule that is already configured on the third device; and if the forwarding rule of the third device conflicts with the fourth forwarding rule, the rule obtaining unit is configured to obtain a calibrated forwarding rule of the third device.

With reference to the sixth or the seventh possible implementation manner of the second aspect, an eighth possible implementation manner of the second aspect is further provided, where the rule obtaining unit is further configured to perform a conflict check on the forwarding rule of the fourth device and a fifth forwarding rule, where the fifth forwarding rule is a forwarding rule that is already configured on the fourth device; and if the forwarding rule of the fourth device conflicts with the fifth forwarding rule, the rule obtaining unit is configured to obtain a calibrated forwarding rule of the fourth device.

With reference to any one of the sixth to the eighth possible implementation manners of the second aspect, a ninth possible implementation manner of the second aspect is further provided, where the rule obtaining unit is further configured to determine whether the forwarding rule of the third device and a forwarding rule of a fifth device in the third device group form a transmission abnormality; and if the forwarding rule of the third device and the forwarding rule of the fifth device in the third device group form a transmission abnormality, the rule obtaining unit is configured to obtain a sixth forwarding rule, where the sixth forwarding rule is a calibrated forwarding rule of the fifth device.

With reference to any one of the sixth to the ninth possible implementation manners of the second aspect, a tenth possible implementation manner of the second aspect is further provided, where the rule obtaining unit is further configured to determine whether the forwarding rule of the fourth device and a forwarding rule of a sixth device in the fourth device group form a transmission abnormality; and if the forwarding rule of the fourth device and the forwarding rule of the sixth device in the fourth device group form a transmission abnormality, the rule obtaining unit is configured to obtain a seventh forwarding rule, where the seventh forwarding rule is a calibrated forwarding rule of the sixth device.

In an eleventh possible implementation manner of the second aspect, the identifier information is a fourth identifier and a fifth identifier, and the condition is a communication requirement for a device group identified by the fourth identifier to join a multicast group identified by the fifth identifier;

the network device group obtaining unit is specifically configured to obtain a fifth device group corresponding to the fourth identifier, where the fifth device group includes a device that communicates with a device identified by the fourth identifier;

the network device group obtaining unit is specifically configured to select a seventh device from the fifth device group according to the communication requirement for the device group identified by the fourth identifier to join the multicast group identified by the fifth identifier, where the seventh device communicates with the device group identified by the fourth identifier; and the network device group obtaining unit is specifically configured to obtain information about the seventh device, where the information about the seventh device includes an identifier of the seventh device and an interface of the seventh device.

With reference to the eleventh possible implementation manner of the second aspect, a twelfth possible implementation manner of the second aspect is further provided, where the rule obtaining unit is specifically configured to obtain a third match field and a third action from the condition, where the third match field corresponds to the communication requirement for the device group identified by the fourth identifier to join the multicast group identified by the fifth identifier, and the third action corresponds to a multicast operation; and the rule obtaining unit is specifically configured to generate a forwarding rule of the seventh device according to the third match field and the third action.

With reference to the twelfth possible implementation manner of the second aspect, a thirteenth possible implementation manner of the second aspect is further provided, where the rule obtaining unit is further configured to perform a conflict check on the forwarding rule of the seventh device and an eighth forwarding rule, where the eighth forwarding rule is a forwarding rule that is already configured on the seventh device; and if the forwarding rule of the seventh device conflicts with the eighth forwarding rule, the rule obtaining unit is configured to obtain a calibrated forwarding rule of the seventh device.

With reference to the twelfth or the thirteenth possible implementation manner of the second aspect, a fourteenth possible implementation manner of the second aspect is further provided, where the rule obtaining unit is further configured to determine whether the forwarding rule of the seventh device and a forwarding rule of an eighth device in the fifth device group form a transmission abnormality; and if the forwarding rule of the seventh device and the forwarding rule of the eighth device in the fifth device group form a transmission abnormality, the rule obtaining unit is configured to obtain a ninth forwarding rule, where the ninth forwarding rule is a calibrated forwarding rule of the eighth device.

With reference to any one of the second aspect or any possible implementation manner of second aspect, a fifteenth possible implementation manner of the second aspect is further provided, where the apparatus further includes:

a detection packet obtaining unit, configured to obtain a detection packet according to the first forwarding rule and the information about the network device group, where the detection packet is used to obtain a detection result from the network device group, and the detection result is a result obtained by detecting communication that is performed by the network device group according to the first forwarding rule;

a second sending unit, configured to send the detection packet to the controller;

a receiving unit, configured to receive the detection result sent by the controller; and an adjustment unit, configured to adjust the contract according to the detection result when the detection result meets a preset condition.

In a sixteenth possible implementation manner of the second aspect, the contract further includes a type of the service, and the type of the service is access, routing, or multicast.

For the method and apparatus for configuring a service in the embodiments of the present application, an NaaS device obtains a contract corresponding to a communication requirement of a user, the NaaS device then may automatically convert a condition in the contract into a first forwarding rule and select, according to identifier information and the condition, information about a network device group that meets a requirement of the contract, and the NaaS device sends the first forwarding rule and the information about the network device group to a controller. The method and apparatus for configuring a service in the embodiments of the present application not only help to implement automatic configuration of a service, but also help to improve efficiency of configuring a service.

BRIEF DESCRIPTION OF DRAWINGS

To describe the technical solutions in the embodiments of the present application more clearly, the following briefly describes the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

In order to make a person skilled in the art better understand the solutions in the present application, the following further describes the embodiments of the present application in detail with reference to accompanying drawings and implementation manners.

A method for configuring a service, which is provided in the embodiments of the present application, is applicable to a network as a service (NaaS) device. The NaaS device may be a device having an NaaS function. For example, the NaaS device may be a network device that communicates with a Controller, the NaaS device may be a Controller integrated with the NaaS function, or the NaaS function of the NaaS device may be implemented by multiple different network devices together, that is, the NaaS function is divided and distributed to the multiple different network devices, so as to implement the NaaS function in a distributed manner. In the embodiments of the present application, a form in which an NaaS device exists in a network is not specifically limited. In the following embodiments of the present application, an NaaS device is used as an example for description, and details of different forms of NaaS devices are not described.

Figure 1:
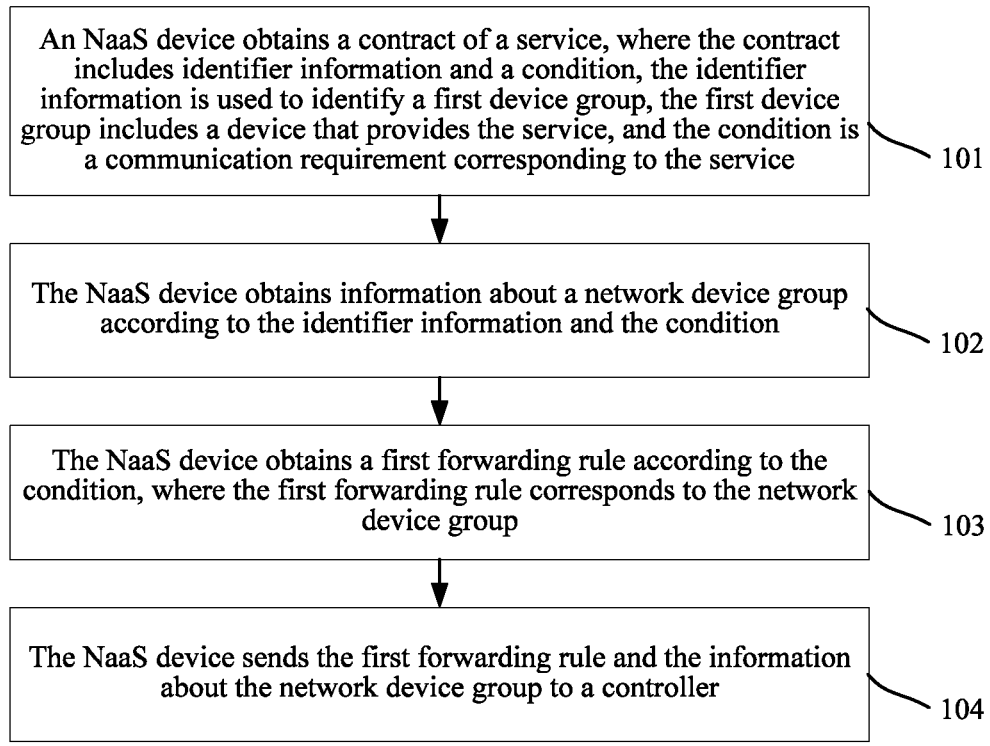
FIG. 1 is a flowchart of a method for configuring a service according to an embodiment of the present application.

Referring to FIG. 1, a method for configuring a service, which is provided in an embodiment of the present application, may include:

101: An NaaS device obtains a contract of a service, where the contract includes identifier information and a condition, the identifier information is used to identify a first device group, the first device group includes a device that provides the service, and the condition is a communication requirement corresponding to the service.

For example, the service (service) is a service required by a user. The contract may be used to denote a condition for communication between two user groups (USG). The contract may be denoted as <USGx, USGy, service type, service contract>, where the USGx and the USGy may be the identifier information included in the contract; the service type is a type of the service, where the service type is optional, and the service type may be used to determine a type of the contract; and the service contract may be the condition included in the contract. In this embodiment of the present application, the contract may be an access contract, a routing contract, or a multicast contract. For example, the access contract may be denoted as <USG1, USG outside, access, access contract>, the routing contract may be denoted as <USG2, USG3, routing, routing contract>, and the multicast contract may be denoted as <USG4, USG multicast, multicast, multicast contract>, where a form of the contract is not limited to the foregoing several forms.

Figure 2:
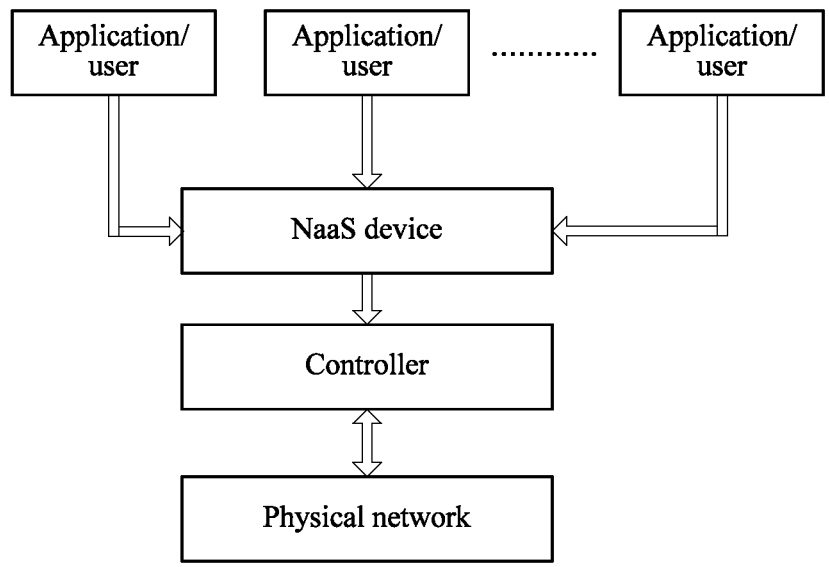
FIG. 2 is a schematic diagram of a network architecture according to an embodiment of the present application.

For example, one or more devices having a same communication requirement may belong to one device group, or one or more devices having a same communication capability may belong to one device group. In this embodiment of the present application, the device group may be referred to as a USG. The USG may be further referred to as an endpoint group (EPG). Referring to a diagram of a network architecture shown in FIG. 2, an NaaS device may communicate with a user and a Controller separately. The NaaS device may obtain the contract of the service according to information that is input by the user. The information that is input by the user may include: a condition and identifier information. The NaaS device may receive a contract that is input by the user in a manner of a command line, a Web interface, or the like. Alternatively, the NaaS device may further predefine description models of some contracts, and the NaaS device may obtain a contract according to a parameter that is input by the user and a predefined description model. In this embodiment of the present application, a specific manner in which the NaaS device obtains a contract may be not specifically limited.

For example, the access contract may be used to denote a condition for a device group identified by the USG1 to access a device group identified by the USG2. The device group identified by the USG1 is a set of devices having a same communication requirement, and the device group identified by the USG2 is a set of devices that can meet a communication requirement of the USG1. The device group identified by the USG2 includes at least one device that can meet the communication requirement of the USG1. The access contract obtained by the NaaS device may be <USG2, access contract>, <USG2, access, access contract>, <USG2, USG1, access contract>, <USG2, USG outside, access, access contract>, <USG2, USG1, access, access contract>, or a like form, and details are not described herein example by example. The USG outside may denote a device group that accesses the USG2 from outside. If the access contract is <USG2, access contract> or <USG2, access, access contract>, the identifier information includes the USG2. If the access contract is <USG2, USG1, access contract> or <USG2, USG1, access, access contract>, the identifier information includes the USG2 and the USG1. If the access contract is <USG2, USG outside, access, access contract>, the identifier information includes the USG2 and the USG outside. The access is used to identify that the contract is an access contract. The access contract includes a condition in the access contract, that is, the access contract includes a communication requirement for accessing the USG2 by the USG1, for example, the communication requirement for accessing the USG2 may include: a port number being 80, a protocol type being Transmission Control Protocol (TCP), and the like.

For example, the routing contract may be used to denote a requirement on communication between a device group identified by the USG3 and a device group identified by the USG4. The routing contract obtained by the NaaS device may be <USG3, USG4, routing contract> or <USG3, USG4, routing, routing contract>. The USG3 and the USG4 are identifier information included in the routing contract, and the routing is used to identify that the contract is a routing contract. The routing contract includes a condition in the routing contract, that is, the routing contract includes the requirement on communication between the device group identified by the USG3 and the device group identified by the USG4. For example, the communication requirement included in the routing contract may be: a bandwidth being 10 G. A direction of routing between the USG3 and the USG4 may be further set in the routing contract. For example, it is set that the routing is unidirectional or bidirectional. If the routing is unidirectional, the routing contract may include a requirement on communication between a source node of the routing and a destination node of the routing. If the routing is bidirectional, the routing contract may include working modes, such as a simplex mode, a half-duplex mode, or a duplex mode, of two devices that provide the routing function.

For example, the multicast contract may be used to denote a multicast communication requirement for a USG5 to join USG multicast. A device group identified by the USG5 is a set of devices that request to join the USG multicast, and the USG multicast is used to identify a multicast group. The multicast contract obtained by the NaaS device may be <USG5, USG multicast, multicast contract> or <USG5, USG multicast, multicast, multicast contract>. The USG5 and the USG multicast are identifier information included in the multicast contract, the USG5 may be used to identify a multicast source or a multicast receiving device, the multicast is used to identify that the contract is a multicast contract, and the multicast contract includes a condition in the multicast contract, that is, the multicast contract includes the multicast communication requirement for the device group identified by the USG5 to join the multicast group identified by the USG multicast. If the USG multicast is used to denote a multicast group whose address is 225.1.1.1, the communication requirement included in the multicast contract may be that the device group identified by the USG5 requests to join the multicast group 225.1.1.1.

102: The NaaS device obtains information about a network device group according to the identifier information and the condition.

For example, if the contract is an access contract or a routing contract, the NaaS device may obtain a candidate device group according to the identifier information, and the NaaS device may obtain the network device group from the candidate device group according to the condition. Alternatively, the NaaS device may directly obtain a locally saved candidate device group, and the NaaS device may obtain the network device group from the candidate device group according to the condition and the identifier information. The candidate device group includes a network device that can meet the condition. If the contract is a multicast contract, the NaaS device may obtain the network device group according to the identifier information and the condition.

For example, while or after selecting the network device group, the NaaS device may obtain the information about the network device group. That is, the candidate device group obtained by the NaaS device is a set denoted by information about a device, so that while obtaining the network device group, the NaaS device obtains the information about the network device group. The information about the network device group includes: an identifier of each device in the network device group and an attribute of each device in the network device group. For example, the identifier of the device may be information that can be used to identify the device, such as an address of the device, a number of the device, a name of the device, or an identity of the device; the attribute of the device may be an interface of the device, and the interface may be denoted by "interface". Alternatively, according to a need of an actual application, the information about the network device group may further include information, such as a layer 2 network (L2 network) or a subnet, that can be used to locate each device in the network device group, and may be not specifically limited in this embodiment of the present application.

For example, the identifier information is used to identify the first device group. The NaaS device may locally save in advance a candidate device group corresponding to the first device group, or locally saves a candidate device group corresponding to the identifier information. The NaaS device may obtain, in a local reading manner according to the identifier information, the candidate device group corresponding to the identifier information. Alternatively, the NaaS device may obtain a candidate device group corresponding to the identifier information from outside according to the identifier information. If the identifier information further includes a Controller identifier (ID), the NaaS device may communicate with a Controller corresponding to the Controller ID, and obtain a candidate device group corresponding to the Controller ID from the Controller corresponding to the Controller ID. Alternatively, the NaaS device saves a correspondence between the Controller ID and a candidate device group. The NaaS device receives a Controller ID that is input by a user, and obtain a corresponding candidate device group according to the Controller ID that is input by the user. In this embodiment of the present application, a manner in which the NaaS device obtains a candidate device group may be not specifically limited.

For example, the NaaS device may obtain a network resource model of a device included in a candidate device group. The network resource model of the device included in the candidate device group may denote a capability of the device. The network resource model of the device may include: an identifier of the device and an attribute of the device. The network resource model may further include: a network hierarchy to which the device belongs, where the network hierarchy may be a layer 2, a layer 3, or another layer, the layer 2 may be a data link layer in an open systems interconnection (OSI) model, the layer 3 may be a network layer in the OSI model, and the another layer may be a layer such as a transmission layer in the OSI model. The network resource model may further include: a function of the device, where the function of the device may be a filtering function, a multicast function, or the like.

For example, the method by using which the NaaS device selects a network device group from a candidate device group may include: if the candidate device group includes multiple devices that meet the condition, selecting any one of the devices as a device in the network device group, or selecting a device having the smallest device number or a device having the largest device number as a device in the network device group.

Optionally, when the candidate device group in this embodiment of the present application includes multiple devices that meet the condition, the NaaS device may select a network device group according to a network hierarchy to which a device belongs. For example, the NaaS device determines whether network hierarchies of the multiple devices that meet the condition are the same. If the network hierarchies are different, the NaaS device selects, from the multiple devices that meet the condition, a device having the lowest network hierarchy as a device in the network device group, which helps to reduce a requirement of a service on a network resource. If the network hierarchies are the same, the NaaS device may randomly select one device as a device in the network device group. Alternatively, when the network hierarchies are the same, the NaaS device may select a device having the smallest device number or a device having the largest device number as a device in the network device group.

Optionally, when the candidate device group includes multiple devices that are in a same network hierarchy or when multiple devices exist in the lowest network hierarchy, the NaaS device in this embodiment of the present application may further send IDs of the multiple devices to a Controller, obtain, from the Controller, load statuses of the devices, for example, quantities of loads that the devices carry and CPU utilization of the devices. The NaaS device may select the network device group according to a load balancing technology and the load statuses of the devices.

Optionally, the NaaS device in this embodiment of the present application may receive a load status, obtained by the Controller in real time, of a device, or receive a load status, obtained by the Controller within a preset time period, of a device, which may be not specifically limited in this embodiment of the present application.

103: The NaaS device obtains a first forwarding rule according to the condition, where the first forwarding rule corresponds to the network device group.

For example, the NaaS device may convert the condition into a forwarding rule of a device in the network device group. The device in the network device group may provide, for a user according to the forwarding rule, a service meeting a communication requirement of the user. In this embodiment of the present application, the first forwarding rule may be embodied as a parameter group shown in FIG. 2, where the parameter group includes a rule and an action, and the parameter group may be denoted as (rule, action).

For example, the NaaS device may first obtain the information about the network device group, and then obtain the first forwarding rule; or the NaaS device may first obtain the first forwarding rule, and then obtain the information about the network device group; or the NaaS device may perform the foregoing two operations at the same time, which may be not specifically limited in this embodiment of the present application.

104: The NaaS device sends the first forwarding rule and the information about the network device group to a controller.

For example, the NaaS device may communicate with the Controller by using a protocol, such as an OpenFlow protocol, that is supported by both the NaaS device and the Controller, or the NaaS device may communicate with the Controller by using another protocol, and details are not described herein example by example.

Optionally, before the NaaS device sends the first forwarding rule and the information about the network device group to the controller, the NaaS device may select a Controller. An example in which the Controller manages a device in a physical network is used, and the NaaS device may select a Controller in the following three manners:

If one Controller exists in the physical network, and the Controller is configured to manage devices in the physical network, the NaaS device may send the first forwarding rule and the information about the network device group to the Controller, and the Controller delivers the first forwarding rule to the network device group.

If at least two Controllers, such as a first Controller and a second Controller, exist in the physical network, and the first Controller and the second Controller manage devices in different areas in the physical network, the information about the network device group may further include a Controller ID. The NaaS device may find, according to the Controller ID, a Controller that manages the network device group. The NaaS device sends the first forwarding rule and the information about the network device group to the Controller corresponding to the Controller ID, and the Controller corresponding to the Controller ID delivers the first forwarding rule to the network device group.

If at least three Controllers, such as a third Controller, a fourth Controller, and a fifth Controller, exist in the physical network, the third Controller manages devices in an area in the physical network, the fourth Controller manages devices in another area in the physical network, the areas managed by the third Controller and the fourth Controller are not completely the same, and the fifth Controller may manage the third Controller and the fourth Controller, the NaaS device may send the first forwarding rule and the information about the network device group to the fifth Controller, and the fifth Controller may deliver the first forwarding rule to the network device group; or the fifth Controller searches for a Controller, for example, the fourth Controller, that manages the network device group, and forwards the first forwarding rule and the information about the network device group to the fourth Controller, and the fourth Controller may deliver the first forwarding rule to the network device group.

For example, if the information, obtained by the NaaS device, about the network device group corresponds to a physical network device, the Controller may determine, according to the information, sent by the NaaS device, about the network device group, one or more devices in physical network devices that are managed by the controller. If the information, obtained by the NaaS device, about the network device group corresponds to a virtual network device, the Controller needs to first perform virtual-physical mapping, to obtain a physical network device corresponding to the virtual network device.

In this embodiment of the present application, a manner in which the Controller manages devices in a network, a process in which the Controller performs virtual-physical mapping, and the like may be not specifically limited, as long as the NaaS device can send, to a corresponding network device by using the Controller, the first forwarding rule and the information about the network device group that are obtained according to the contract.

In this embodiment of the present application, a user needs to provide, for an NaaS device, only a contract or a parameter that reflects a communication requirement of the user, and the NaaS device may obtain identifier information and a condition in the contract, and obtain information about a network device group according to the identifier information and the condition. The NaaS device may deliver a first forwarding rule that is obtained according to the condition, to configure a service on a selected network device group, which helps to simplify operations and improve configuration efficiency. In addition, the NaaS device may further select the network device group according to a cost of a device, a load status of a device, and the like, which helps to reduce a cost of a device and improve running efficiency of a service.

Optionally, after 103, the method provided in this embodiment of the present application may further include: performing, by the NaaS device, a rule check on the first forwarding rule. The rule check may be a rule check of the network device group, or a rule check between the network device group and another device in a candidate device group. When the rule check is the rule check of the network device group, if the first forwarding rule passes the rule check, the NaaS device sends the first forwarding rule and the information about the network device group to the Controller. If the first forwarding rule does not pass the rule check, the NaaS device may calibrate the first forwarding rule, and send the information about the network device group and a calibrated first forwarding rule to the Controller. When the rule check is the rule check between the network device group and the another device in the the candidate device group, if the first forwarding rule passes the rule check, the NaaS device sends the first forwarding rule and the information about the network device group to the Controller. If the first forwarding rule does not pass the rule check, the NaaS device may calibrate the first forwarding rule, and send the information about the network device group and a calibrated first forwarding rule to the Controller, or the NaaS device calibrates a rule of the another device in the candidate device group, and sends the information about the network device group and the first forwarding rule to the Controller.

Optionally, after 103, the method provided in this embodiment of the present application may further include: obtaining, by the NaaS device, a detection packet according to the first forwarding rule and the information about the network device group, where the detection packet is used to obtain a detection result from the network device group, and the detection result is a result of communication that is performed by the network device group according to the first forwarding rule; and sending, by the NaaS device, the detection packet to the controller. The controller sends the detection packet to the network device group according to the information, included in the detection packet, about the network device group.

Optionally, after the sending, by the NaaS device, the detection packet to the controller, the method further includes: receiving, by the NaaS device, the detection result sent by the controller; and if the detection result meets a preset condition, adjusting, by the NaaS device, the contract according to the detection result. For example, the NaaS device may determine, by means of comparison, whether the detection result meets the preset condition.

The access contract, the routing contract, and the multicast contract described above are separately used as examples to explain and describe a service configuration process in the embodiments of the present application below.

Embodiment 1

Embodiment 1 is an embodiment related to an access contract. An application scenario of Embodiment 1 may be a scenario of a data center. Devices of the data center may be divided into the following USGs according to communication capabilities of the devices: a public network USG, a private network USG, a network (Web) USG, an application (App) USG, a database (DB) USG, and the like. In Embodiment 1, an access filtering service during access of the public network USG to the Web USG is used as an example for description.

1. A user determines a public network USG and a Web USG according to a communication requirement.

The user may obtain an access condition for a terminal to access a Web server, and determine one or more terminals that need to access the Web server as one USG, to form the public network USG.

The user determines the Web USG according to a Web server included in a data center network that is used. In this example, the Web USG is a first identifier. For example, a device group identified by the Web USG may be a set of devices included in an area A in FIG. 3, that is, the device group identified by the Web USG includes the Web server. The device group identified by the Web USG may be further a set of devices included in an area B in FIG. 3, that is, the device group identified by the Web USG includes the Web server and an access router 1. Alternatively, the device group identified by the Web USG may be further a set of devices included in the data center network. In this embodiment of the present application, specific composition of the device group identified by the Web USG may be not specifically limited. In this embodiment of the present application, the device group identified by the Web USG includes at least the Web server.

2. An NaaS device obtains an access contract.

For example, the NaaS device may receive an access contract that is input by a user in a manner of a command line, a Web interface, or the like. Alternatively, the NaaS device may further predefine description models of some access contracts, and the NaaS device may generate an access contract according to a parameter that is input by the user and a predefined description model. In this embodiment of the present application, a specific manner in which the NaaS device obtains an access contract may be not specifically limited.

Figure 3:
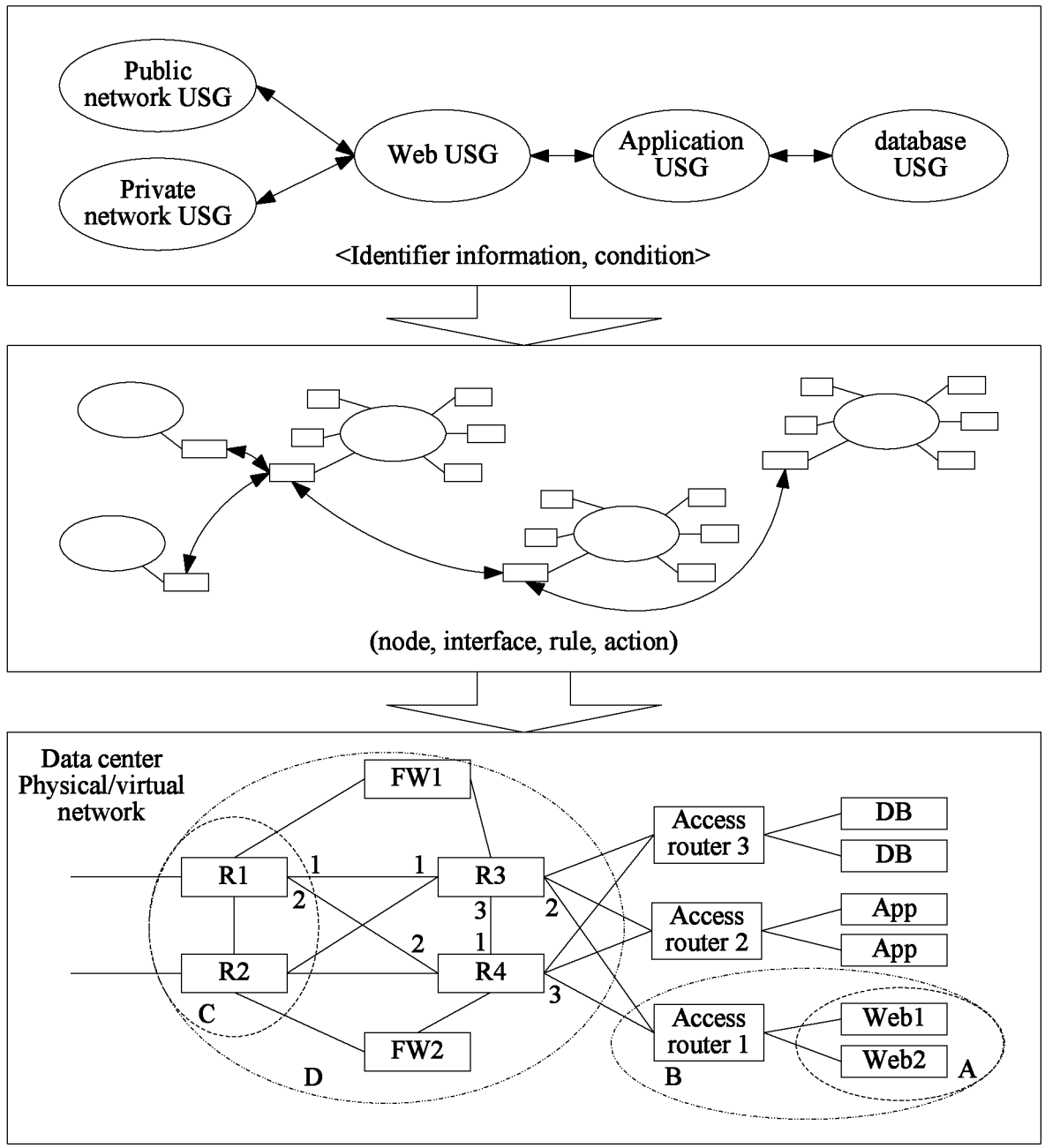
FIG. 3 is a schematic diagram of a scenario of implementing an access filtering service according to an embodiment of the present application.

For example, in the embodiment corresponding to FIG. 3, the access contract may be denoted as <USG2, access contract>, the USG2 may include an ID of a Web USG. The USG2 may further include an ID of a device included in a device group identified by the Web USG. Optionally, the USG2 may further include an ID of a Controller corresponding to a device included in the Web USG. The ID of the device included in the device group identified by the Web USG may be Web1 and Web2 in FIG. 3. The access contract is a communication requirement for accessing the device group identified by the Web USG, and may include a rule and an action, where the rule may include a port whose number is 22 and a protocol being the Secure Shell (SSH), and the action may include permitting access.

3. The NaaS device obtains information about a network device group.

For example, that the NaaS device obtains information about a network device group may include: The NaaS device obtains a second device group corresponding to a Web USG; the NaaS device may select a first device from the second device group according to a condition; and the NaaS device obtains information about the first device. Alternatively, that the NaaS device obtains information about a network device group may include: The NaaS device reads a locally saved second device group; the NaaS device may traverse the second device group, and select, from the second device group, a first device that meets a Web USG and a condition; and the NaaS device obtains information about the first device. The second device group belongs to a candidate device group, and the first device belongs to the network device group.

For example, the NaaS device may obtain the second device group according to the Web USG. The second device group may be a set of devices included in an area C in FIG. 3, a set of devices included in an area D in FIG. 3, or a set of devices included in the data center network. In this embodiment of the present application, composition of the second device group may be not specifically limited, and the second device group includes at least a device that can implement a filtering function.

An example in which the area C or the area D in FIG. 3 is separately used as the second device group is used below to explain and describe a process in which the NaaS device obtains information about a network device group in this embodiment of the present application.

If the second device group is a set of devices included in the area C, that is, the area C includes two egress routers, which are respectively R1 and R2, that the NaaS device obtains information about a network device group may include:

(1) Devices that meet the condition of the access contract are obtained.

For example, the condition included in the access contract in this embodiment is an access condition for a public network USG to access a Web USG, that is, the network device group needs to have a filtering function. The NaaS device may learn functions of the devices included in the area C, and determine that both R1 and R2 have a filtering function.

(2) The first device is selected from the devices that meet the condition of the access contract, and the information about the first device is obtained.

For example, the NaaS device selects either of R1 and R2 as the first device.

Optionally, the NaaS device may select a device having a relatively low network hierarchy as the first device, that is, perform selection according to network hierarchies to which R1 and R2 belong. If both R1 and R2 are layer 3 devices, the NaaS device may select either of R1 and R2 as the first device. If R1 is a layer 3 device and R2 is a layer 4 device, the NaaS device may select R1 as the first device, which helps to reduce a requirement of a service on a network resource.

Optionally, the NaaS device may further perform selection according to quantities of loads carried by R1 and R2. If a quantity of loads carried by R2 is less than a quantity of loads carried by R1, the NaaS device may select R2 as the first device. When R1 and R2 are in a same network hierarchy, the NaaS device may further perform selection according to the quantities of loads carried by R1 and R2. That is, when both R1 and R2 are layer 3 devices, and the quantity of loads carried by R2 is relatively small, the NaaS device may select R2 as the first device, which helps to improve running efficiency of a service.

Optionally, after determining that R1 and R2 have a filtering function, or after learning that network hierarchies of R1 and R2 are the same, the NaaS device may select an egress router having a relatively small number or a relatively large number as the first device.

For example, the NaaS device may obtain an identifier and an interface of the selected first device, for example, obtain a node ID and an interface of the first device. The NaaS device may use the obtained identifier and interface as the information about the first device.

If the second device group is a set of devices included in the area D, that is, the area D includes two egress routers such as R1 and R2, two firewall devices such as FW1 and FW2, and two aggregation routers such as R3 and R4, that the NaaS device obtains information about a network device group may include:

(1) Devices having a filtering function are selected according to the condition included in the access contract.

For example, among the devices included in the area D, neither R3 nor R4 has a filtering function, and the NaaS device selects R1, R2, FW1, and FW2 from the area D.

(2) The first device is selected from R1, R2, FW1, and FW2, and the information about the first device is obtained.

For example, the NaaS device may select, from R1, R2, FW1, and FW2, a device having a relatively low network hierarchy. If a network hierarchy is a layer 3 for R1 and R2, and is a layer 4 for FW1 and FW2, the NaaS device may select R1 and R2. The NaaS device may select either device from R1 and R2 as the first device, or the NaaS device may select, from R1 and R2, a device having a relatively small quantity of loads as the first device.

Optionally, after determining that R1, R2, FW1, and FW2 have a filtering function, or after learning that R1 and R2 are in a same network hierarchy, the NaaS device may select a device having a relatively small number or a relatively large number as the first device.

For example, the NaaS device may obtain an identifier and an interface of the selected first device, and use the identifier and the interface as the information about the first device.

Optionally, before the devices having a filtering function are selected, that the NaaS device obtains information about a network device group may further include: determining whether network devices connected to Web1 or Web2 exist in the second device group. If the network devices connected to Web1 or Web2 do not exist, the NaaS device traverses the second device group according to the method in (1), and selects devices having a filtering function. If the network devices connected to Web1 or Web2 exist, the NaaS device may obtain, from the network devices connected to Web1 or Web2, devices having a filtering function, which helps to narrow down a search range.

4. The NaaS device obtains a first forwarding rule.

For example, that the NaaS device obtains a first forwarding rule may include: The NaaS device obtains a first match field and a first action from the condition of the access contract, where the first match field corresponds to the communication requirement for accessing the device group identified by the first identifier, and the first action corresponds to an access operation; and the NaaS device generates a forwarding rule of the first device according to the first match field and the first action. The forwarding rule of the first device is the first forwarding rule.

For example, the first match field corresponds to the condition in the access contract, and may include at least one of a port, a protocol, an IP address, or a MAC address. For example, the port whose number is 22, and the protocol is the SSH. The first action corresponds to an access operation, and may include at least one of permitting access, forbidding access, redirection, or mirroring.

In this embodiment of the present application, the forwarding rule of the first device may be an access control list (ACL), and the ACL may be obtained after the NaaS device converts the condition in the access contract. For example, if the rule in the access contract may include a port whose number is 22 and a protocol being the SSH protocol, and the action in the access contract may include permitting access, the ACL obtained by the NaaS device may be denoted as: rule permit protocol SSH dport 22, where dport 22 denotes that a destination port whose number is 22.

5. The NaaS device delivers the first forwarding rule and the information about the network device group to a Controller.

For example, if the information about the selected first device includes R1 and an interface1, and the ACL is rule permit protocol SSH dport 22, (node, interface, rule, action) delivered by the NaaS device to the Controller may be denoted as (R1, interface1, rule permit protocol SSH dport 22), where the interface 1 may be used to identify an interface of R1, and dport 22 may be a destination port carried in a packet received by R1.

Optionally, after obtaining the forwarding rule of the first device, the NaaS device may further perform a rule check on the obtained forwarding rule of the first device. For example, in this embodiment of the present application, the rule check may be performed on the forwarding rule of the first device in the following two implementation manners.

In a first implementation manner, the rule check is performed on the forwarding rule of the first device. Performing the rule check on the forwarding rule of the first device may be performing the rule check on the first device or performing the rule check between the first device and another device in the second device group.

(1) The performing the rule check on the first device includes:

The NaaS device performs a conflict check on the forwarding rule of the first device and a second forwarding rule, where the second forwarding rule is a forwarding rule that is already configured on the first device. If a conflict exists, that is, the forwarding rule of the first device does not pass the rule check, the NaaS device obtains a calibrated forwarding rule of the first device, and sends the calibrated forwarding rule of the first device and the information about the first device to the Controller. If a conflict does not exist, that is, the forwarding rule of the first device passes the rule check, the NaaS device sends the forwarding rule of the first device and the information about the first device to the Controller.

For example, for an access service of a research and development department, the following already configured forwarding rule is set on a device S0: a research and development department server cannot access an external network, and all employees of the research and development department may access an internal network of a company by using a device S1. Meanwhile, for a pre-research group that belongs to the research and development department, during automatic configuration of the access service, the network device group selected by the NaaS device is the device S0, and the obtained first forwarding rule is: a pre-research group server cannot access an SSH service, and a pre-research group employee may access an external network by using a device S2. In such a case, the NaaS device may perform a rule check on the first forwarding rule by using the following method.

(a) For the forwarding rule "a research and development department server cannot access an external network, and all employees of the research and development department may access an internal network of a company by using a device S1" that is already configured on the device S0, an IP address of an employee of the research and development department is located in a network segment 10.0.0.0/8, that is, a network segment 10.0.0.1 to 10.255.255.255, where "\" denotes "excluding", an IP address of the research and development department server is 10.0.0.1, ∪ denotes "or", a port 80 is used to access an external network, and →{S1} denotes "by using the device S1". The already configured forwarding rule may be described as: SrcAddr:10.0.0.0/8\ (SrcAddr:10.0.0.1 ∪DstPort:80)→{S1}. The NaaS device may decompose the already configured forwarding rule to obtain three first rules:

(a1) The research and development department server having the IP address of 10.0.0.1 cannot access the external network by using the device S1.

A first rule A1: SrcAddr:10.0.0.1:{ }, where when content in { } is empty, it denotes discarding. In this embodiment of the present application, discarding means skipping execution of all actions in the already configured forwarding rule. For example, an action in the already configured forwarding rule is "go to the device S1", and the action of discarding in the first rule A1 is "not go to the device S1".

(a2) An employee of the research and development department cannot access the external network by using the device S1.

A first rule A2: DstPort: 80:{ }.

(a3) An employee of the research and development department accesses the internal network by using the device S1.

A first rule A3: SrcAddr:10.0.0.0/8: {S1}, where {S1} denotes "go to the device S1".

(b) For the first forwarding rule "a pre-research group server cannot access an SSH service, and a pre-research group employee may access an external network by using a device S2", an IP address of a pre-research group employee is located in a network segment 10.2.0.0/16, that is, the network segment 10.2.0.1 to 10.2.255.255, "\" denotes "excluding", an IP address of the pre-research group server is 10.2.0.1, ∪ denotes "or", a port 22 is used to access the SSH service, and →{S2} denotes "by using the device S2". In this way, the first forwarding rule may be described as: SrcAddr: 10.2.0.0/16 \ (SrcAddr: 10.2.0.1 ∪ DstPort:22) →{S2}. The NaaS device may decompose the first forwarding rule to obtain three second rules:

(b1) The pre-research group server having the IP address of 10.2.0.1 cannot access the SSH service by using the device S2.

A second rule B1: SrcAddr:10.2.0.1:{ }, where when content in { } is empty, it denotes discarding.

(b2) A pre-research employee cannot access the SSH service by using the device S2.

A second rule B2: DstPort:22:{ }.

(b3) A pre-research employee accesses the external network by using the device S2.

A second rule B3: SrcAddr:10.2.0.0/16:{S2}.

It may be understood that, as may be learned from the description of the already configured forwarding rule, priorities of the first rules are A1>A2>A3 in a descending order. As may be learned from the description of the first forwarding rule, priorities of the second rules are B1>B2>B3 in a descending order.

Optionally, to achieve an effect of complete coverage, one matching rule having the lowest priority may be added to both the first rules and the second rules, where a match field of the matching rule is a wildcard character, and an action is discarding. For example, a first matching rule is newly added as a first rule A4: *:{ }, and the first rule A4 may be denoted as: discarding any packet that does not match match fields in the first rules A1, A2, and A3. A second matching rule is newly added as a second rule B4: *: { }, and the second rule B4 may be denoted as: discarding any packet that does not match match fields in the second rules B1, B2, and B3.

(c) The NaaS device performs negation on a first rule to obtain a first negation rule. Performing negation on the first rule is keeping a match field of the first rule unchanged and performing negation on an action of the first rule.

A first negation rule C1: SrcAddr:10.0.0.1: {S1}, where {S1} denotes "go to the device S1".

A first negation rule C2: DstPort:80:{S1}.

A first negation rule C3: SrcAddr:10.0.0.0/8: {$\overline{S1}$}, where {$\overline{S1}$} denotes "not go to the device S1".

A first negation rule C4: *: {S1}.

(d) The NaaS device performs negation on a second rule to obtain a second negation rule. Performing negation on the second rule is keeping a match field of the second rule unchanged and performing negation on an action of the second rule.

A second negation rule D1: SrcAddr:10.2.0.1: {S2}, where {S2} denotes "go to the device S2".

A second negation rule D2: DstPort:22: {S2}.

A second negation rule D3: SrcAddr:10.2.0.0/16:{$\overline{S2}$}, where {$\overline{S2}$} denotes "not go to the device S2".

A second negation rule D4: *: {S2}.

A priority of each first negation rule is the same as a priority of a corresponding first rule, and a priority of each second negation rule is the same as a priority of a corresponding second rule.

(e) The NaaS device combines the first negation rules and the second negation rules two by two according to a rule synthesis principle, to generate 16 first execution rules.

(e1) A priority of a first execution rule is sorted according to priorities of synthesizing two negation rules of the first execution rule. For example, if a priority of the already configured forwarding rule is higher than that of the first forwarding rule, the NaaS device may perform sorting according to priorities of first negation rules obtained by decomposing the already configured forwarding rule. When the first negation rules have a same priority, the NaaS device may perform sorting according to priorities of second negation rules obtained by decomposing the first forwarding rule. For example, the first execution rules obtained by the NaaS device are C1D1, C1D2, C2D1, C3D2, C3D4, and C4D1, and therefore, the first execution rules may be sorted as C1D1>C1D2>C2D1>C3D2>C3D4>C4D1 according to priorities in a descending order.

(e2) The NaaS device may use each first negation rule as one element, and perform arrangement according to a priority order of the first negation rules, to form a first matrix $\overline{P1}$, where the first matrix $\overline{P1}$ is a column matrix. The NaaS device uses each second negation rule as one element, and performs arrangement according to a priority order of the second negation rules, to form a second matrix $\overline{P2}$, where the second matrix $\overline{P2}$ is a row matrix. For example, a matrix formed by rules having high priorities may be used as a column matrix.

(e3) The NaaS device performs multiplication processing on the first matrix and the second matrix, to obtain a first execution rule matrix.

$$\overline{P1} \times \overline{P2} = \begin{bmatrix} C1 \\ C2 \\ C3 \\ C4 \end{bmatrix} \times [D1, D2, D3, D4] = \begin{bmatrix} C1D1, C2D1, C3D1, C4D1 \\ C1D2, C2D2, C3D2, C4D2 \\ C1D3, C2D3, C3D3, C4D3 \\ C1D4, C2D4, C3D4, C4D4 \end{bmatrix}$$

(e4) After obtaining the first execution rule matrix by means of calculation, the NaaS device may obtain a first execution rule according to the rule synthesis principle.

The rule synthesis principle may include: If a match field of a first negation rule and a match field of a second negation rule are of a same type, continue to determine whether an intersection set exists between the match field of the first negation rule and the match field of the second negation rule. If no intersection set exists between the match field of the first negation rule and the match field of the second negation rule, a rule obtained by synthesizing the first negation rule and the second negation rule is an invalid rule. If an intersection set exists between the match field of the first negation rule and the match field of the second negation rule, the intersection set between the match field of the first negation rule and the match field of the second negation rule and an intersection set between an action of the first negation rule and an action of the second negation rule form a valid first execution rule. If a match field of a first negation rule and a match field of a second negation rule are of different types, a union set between the match field of the first negation rule and the match field of the second negation rule and an intersection set between an action of the first negation rule and an action of the second negation rule form a valid first execution rule. Optionally, in another application embodiment, the rule synthesis principle may further include: If there is no intersection set after negation is performed on the intersection set between the action of the first negation rule and the action of the second negation rule, a rule obtained by synthesizing the first negation rule and the second negation rule is also considered as an invalid rule.

For C1D1, the first negation rule C1 is: SrcAddr:10.0.0.1:{S1}, and the second negation rule D1 is: SrcAddr:10.2.0.1:{S2}. A match field of C1 is an IP address 10.0.0.1, a match field of D1 is an IP address 10.2.0.1, and the two match fields are of a same type, but have no intersection set. Therefore, C1D1 is an invalid rule.

For C1D2, the first negation rule C1 is: SrcAddr:10.0.0.1:{S1}, and the second negation rule D2 is: DstPort:22:{S2}. A match field of C1 is an IP address 10.0.0.1, a match field of D2 is a port address 22, and the two match fields are of different types. Therefore, C1D2 uses a union set between the match field of C1 and the match field of D2 and an intersection set between an action of C1 and an action of D2, and C1D2 is 10.0.0.1,22:{S1∩S2}.

For C1D3, the first negation rule C1 is: SrcAddr;10.0.0.1;{S1}, and the second negation rule D3 is: SrcAddr;10.2.0.0/16; {$\overline{S2}$}. A match field of C1 is an IP address 10.0.0.1, a match field of D3 is 10.2.0.0/16, that is, 10.2.0.1 to 10.2.255.255, and the two match fields are of a same type, but have no intersection set. Therefore, C1D3 is an invalid rule.

For C1D4, the first negation rule C1 is: SrcAddr;10.0.0.1;{S1}, and the second negation rule D4 is: *; {S2}. A match field of C1 is an IP address 10.0.0.1, a match field of D4 is a wildcard character *, and the two match fields are of a same type. Therefore, C1D4 uses an intersection set between the match field of C1 and the match field of D4 and an intersection set between an action of C1 and an action of D4, and C1D4 is 10.0.0.1: {S1 ∩S2}.

For C2D1, the first negation rule C2 is: DstPort:80:{S1}, and the second negation rule D1 is: SrcAddr:10.2.0.1:{S2}. A match field of C2 is a port address 80, a match field of D1 is an IP address 10.2.0.1, and the two match fields are of different types. Therefore, C2D1 uses a union set between the match field of C2 and the match field of D1 and an intersection set between an action of C2 and an action of D1, and C2D1 is 10.2.0.1,80:{S1∩S2}.

For C2D2, the first negation rule C2 is: DstPort:80:{S1}, and the second negation rule D2 is: DstPort:22:{S2}. A match field of C2 is a port address 80, a match field of D2 is a port address 22, and the two match fields are of a same type, but have no intersection set. Therefore, C2D2 is an invalid rule.

For C2D3, the first negation rule C2 is: DstPort:80:{S1}, and the second negation rule D3 is: SrcAddr:10.2.0.0/16: {$\overline{S2}$}. A match field of C2 is a port address 80, a match field of D3 is 10.2.0.0/16, that is, 10.2.0.1 to 10.2.255.255, and the two match fields are of a same type. Therefore, C2D3 uses a union set between the match field of C2 and the match field of D3 and an intersection set between an action of C2 and an action of D3, and C2D3 is 10.2.0.0/16, 80:{S1∩$\overline{S2}$}.

For C2D4, the first negation rule C2 is: DstPort:80:{S1}, and the second negation rule D4 is: *: {S2}. A match field of C2 is a port address 80, a match field of D4 is a wildcard character *, and the two match fields are of a same type. Therefore, C2D4 uses an intersection set between the match field of C2 and the match field of D4 and an intersection set between an action of C2 and a action of D4, and C2D4 is 80:{S1∩S2}.

For C3D1, the first negation rule C3 is: SrcAddr:10.0.0.0/8: {$\overline{S1}$}, and the second negation rule D1 is: SrcAddr:10.2.0.1:{S2}. A match field of C3 is a network segment address 10.0.0.0/8, that is, 10.0.0.0 to 10.255.255.255, a match field of D1 is an IP address 10.2.0.1, and the two match fields are of a same type, and have an intersection set. Therefore, C3D1 uses the intersection set between the match field of C3 and the match field of D1 and an intersection set between an action of C3 and the action of D1, and C3D1 is 10.2.0.1:{$\overline{S1}$∩S2}.

For C3D2, the first negation rule C3 is: SrcAddr:10.0.0.0/8: {$\overline{S1}$}, and the second negation rule D2 is: DstPort:22:{S2}. A match field of C3 is a network segment address 10.0.0.0/8, that is, 10.0.0.0 to 10.255.255.255, a match field of D2 is a port address 22, and the two match fields are of different types. Therefore, C3D2 uses a union set between the match field of C3 and the match field of D2 and an intersection set between an action of C3 and an action of D2, and C3D2 is 10.0.0.0/8,22:{$\overline{S1}$∩S2}.

For C3D3, the first negation rule C3 is: SrcAddr;10.0.0.0/8: {$\overline{S1}$}, and the second negation rule D3 is: SrcAddr;10.2.0.0/16: {$\overline{S2}$}. A match field of C3 is a network segment address 10.0.0.0/8, that is, 10.0.0.0 to 10.255.255.255, a match field of D3 is 10.2.0.0/16, that is, 10.2.0.1 to 10.2.255.255, and the two match fields are of a same type, and have an intersection set. Therefore, C3D3 uses the intersection set between the match field of C3 and the match field of D3 and an intersection set between an action of C3 and an action of D3, and C3D3 is 10.2.0.0/16:{$\overline{S1}$∩$\overline{S2}$}.

For C3D4, the first negation rule C3 is: SrcAddr:10.0.0.0/8:{$\overline{S1}$}, and the second negation rule D4 is: *:{$\overline{S2}$}. A match field of C3 is a network segment address 10.0.0.0/8, that is, 10.0.0.0 to 10.255.255.255, a match field of D4 is a wildcard character *, and the two match fields are of a same type. Therefore, C3D4 uses an intersection set between the match field of C3 and the match field of D4 and an intersection set between an action of C3 and an action of D4, and C3D4 is 10.0.0.0/8:{$\overline{S1}$∩S2}:

For C4D1, the first negation rule C4 is: *:{S1}, and the second negation rule D1 is: SrcAddr:10.2.0.1:{S2}. A match field of C4 is a wildcard character *, a match field of D1 is an IP address 10.2.0.1, and the two match fields are of a same type, and have an intersection set. Therefore, C4D1 uses the intersection set between the match field of C4 and the match field of D1 and an intersection set between an action of C4 and an action of D1, and C4D1 is 10.2.0.1: {S1∩S2}.

For C4D2, the first negation rule C4 is: *:{S1}, and the second negation rule D2 is: DstPort:22:{S2}. A match field of C4 is a wildcard character *, a match field of D2 is a port address 22, and the two match fields are of a same type. Therefore, C4D2 uses an intersection set between the match field of C4 and the match field of D2 and an intersection set between an action of C4 and an action of D2, and C4D2 is 22: {S1∩S2}.

For C4D3, the first negation rule C4 is: *:{S1}, and the second negation rule D3 is: SrcAddr:10.2.0.0/16:{$\overline{S2}$}. A match field of C4 is a wildcard character *, a match field of D3 is 10.2.0.0/16, that is, 10.2.0.1 to 10.2.255.255, and the two match fields are of a same type. Therefore, C4D3 uses an intersection set between the match field of C4 and the match field of D3 and an intersection set between an action of C4 and an action of D3, and C4D3 is 10.2.0.0/16:{S1∩$\overline{S2}$}.

For C4D4, the first negation rule C4 is: *:{S1}, and the second negation rule D4 is: *:{S2}. A match field of C4 is a wildcard character *, a match field of D4 is a wildcard character *, and the two match fields are of a same type. Therefore, C4D4 uses an intersection set between the match field of C4 and the match field of D4 and an intersection set between an action of C4 and an action of D4, and C4D4 is *:{S1∩S2}.

(f) The NaaS device deletes an invalid rule, uses a remaining first execution rule as a valid first execution rule, performs negation on each valid first execution rule, and then performs conversion according to a protocol supported by the device S0 to obtain a forwarding entry corresponding to the device S0.

For example, performing negation on a valid first execution rule is keeping a match field unchanged and performing negation on an action.

For example, sin $\overline{S1 \cap S2} = \overline{S1} \cup \overline{S2} = \{ \}$, $\overline{S1 \cap S2} = \overline{S1} \cup S2 = S2$, $\overline{S1 \cap \overline{S2}} = S1 \cup \overline{S2} = S1$, and $\overline{\overline{S1} \cap \overline{S2}} = S1 \cup S2 = S2, S2$.

In the first execution rule matrix formed in (e):

Because C1D1 is an invalid rule, C1D1 is deleted, and negation does not need to be performed on C1D1.

Negation is performed on C1D2 (10.0.0.1,22: {S1 ∩S2}), to obtain 10.0.0.1,22:{$\overline{S1 \cap S2}$}, where {$\overline{S1 \cap S2}$=}. Therefore, the negation of the first execution rule may be simplified and denoted as 10.0.0.1,22:{ }.

Because C1D3 is an invalid rule, C1D3 is deleted, and negation does not need to be performed on C1D3.

Negation is performed on C1D4 (10.0.0.1:{S1∩S2}), to obtain 10.0.0.1:1 {$\overline{S1 \cap S2}$}, where $\overline{S1 \cap S2}$={ }. Therefore, the negation of the first execution rule may be simplified and denoted as 10.0.0.1:{ }.

Negation is performed on C2D1 (10.2.0.1,80:{S1∩S2}), to obtain 10.2.0.1,80:{$\overline{S1 \cap S2}$}, where $\overline{S1 \cap S2}$={ }. Therefore, the negation of the first execution rule may be simplified and denoted as 10.2.0.1,80:{ }.

Because C2D2 is an invalid rule, C2D2 is deleted, and negation does not need to be performed on C2D2.

Negation is performed on C2D3 (10.2.0.0/16.80; {S1∩$\overline{S2}$}), to obtain 10.2.0.0/16,80; {$\overline{S1 \cap \overline{S2}}$}, where $\overline{S1 \cap \overline{S2}}$=S2. Therefore, the negation of the first execution rule may be simplified and denoted as 10.2.0.0/16, 80: {S2}.

Negation is performed on C2D4 (80: {S1 ∩S2}), to obtain 80:{$\overline{S1 \cap S2}$}, where $\overline{S1 \cap S2}$={ }. Therefore, the negation of the first execution rule may be simplified and denoted as 80:{ }.

Negation is performed on C3D1 (10.2.0.1:{S1∩S2}, to obtain 10.2.0.1:{$\overline{S1 \cap S2}$}, where $\overline{S1 \cap S2}$=S1. Therefore, the negation of the first execution rule may be simplified and denoted as 10.2.0.1:{S1}.

Negation is performed on C3D2 (10.0.0.0/8,22:{$\overline{S1} \cap S2$}), to obtain 10.0.0.0/8,22:{$\overline{\overline{S1} \cap S2}$}, where $\overline{\overline{S1} \cap S2}$=S1. Therefore, the negation of the first execution rule may be simplified and denoted as 10.0.0.0/8,22:{S1}.

Negation is performed on C3D3 (10.2.0.0/16:{$\overline{S1} \cap \overline{S2}$}), to obtain 10.2.0.0/16:{$\overline{\overline{S1} \cap \overline{S2}}$}, where $\overline{\overline{S1} \cap \overline{S2}}$=S2,S2. Therefore, the negation of the first execution rule may be simplified and denoted as 10.2.0.0/16:{S1, S2}.

Negation is performed on C3D4 (10.0.0.0/8:{$\overline{S1} \cap S2$}), to obtain 10.0.0.0/8:{$\overline{\overline{S1} \cap S2}$}, where $\overline{\overline{S1} \cap S2}$=S1. Therefore, the negation of the first execution rule may be simplified and denoted as 10.0.0.0/8:{S1}.

Negation is performed on C4D1 (10.2.0.1:{S1∩S2}), to obtain 10.2.0.1:{$\overline{S1 \cap S2}$}, where $\overline{S1 \cap S2}$={ }. Therefore, the negation of the first execution rule may be simplified and denoted as 10.2.0.1:{ }.

Negation is performed on C4D2 (22:{S1∩S2}), to obtain 22:{$\overline{S1 \cap S2}$}, where $\overline{S1 \cap S2}$={ }. Therefore, the negation of the first execution rule may be simplified and denoted as 22:{ }.

Negation is performed on C4D3 (10.2.0.0/16:{S1∩$\overline{S2}$}), to obtain 10.2.0.0/16:{$\overline{S1 \cap \overline{S2}}$}, where $\overline{S1 \cap \overline{S2}}$=S2. Therefore, the negation of the first execution rule may be simplified and denoted as 10.2.0.0/16:{S2}.

Negation is performed on C4D4 (*:{S1∩S2}), to obtain *:{$\overline{S1 \cap S2}$}, where $\overline{S1 \cap S2}$={ }. Therefore, the negation of the first execution rule may be simplified and denoted as *: { }.

After performing negation on valid first execution rules, the NaaS device performs conversion according to a protocol supported by the device S0 to obtain corresponding forwarding entries, to enable the device S0 to forward a packet according to the forwarding entry. Optionally, priorities of the forwarding entries may have a same order as the priorities of the first execution rules corresponding to the forwarding entries. After receiving a packet, the device S0 may forward the packet to another forwarding device according to a forwarding entry having the highest priority in forwarding entries that match the packet, for example, forward the packet to the device S1 or the device S2. In this way, invalid rules in which a conflict exists are deleted, which may avoid a rule conflict between an already configured forwarding rule and the first forwarding rule, so that the device S0 can execute both the already configured forwarding rule and the first forwarding rule.

(2) The performing the rule check between the first device and another device in the second device group includes:

The NaaS device determines whether the forwarding rule of the first device and a forwarding rule of a second device in the second device group form a transmission abnormality. If a transmission abnormality is formed, the NaaS device obtains a third forwarding rule, and the NaaS device sends the forwarding rule of the first device and the information about the first device to the Controller. If no transmission abnormality is formed, the NaaS device sends the forwarding rule of the first device and the information about the first device to the Controller. For example, the third forwarding rule may be a calibrated forwarding rule of the second device. For example, the NaaS device may calibrate the forwarding rule of the second device, to obtain a calibrated forwarding rule of the second device. The second device may directly communicate with the first device, or the second device may indirectly communicate with the first device.

The rule check is used to detect whether a transmission abnormality occurs in the second device group. If a transmission abnormality exists, it indicates that a packet cannot be correctly forwarded to a destination node, and rule calibration needs to be performed. The transmission abnormality may be a loop or a blackhole, or may be another transmission abnormality, and details are not described one by one. During the rule check, the NaaS device may perform at least one type of detection of loop detection or blackhole detection.

If the second device group is a set of devices included in the area D in FIG. 3, the loop detection and the blackhole detection are separately used as examples to explain and describe a process of checking the forwarding rule of the first device below.

Example Regarding the Loop Detection

For example, egress routers in the area D are R1 and R2, and aggregation routers are R3 and R4. In the area D, an interface 1 of R1 is connected to R3, an interface 2 of R3 is connected to an access router 1, and the access router 1 may communicate with a Web server. The NaaS device may learn forwarding rules configured on all devices included in the area D. The forwarding rule configured on R1 is: forwarding a packet by using an outbound interface 1. The forwarding rule configured on R3 is: forwarding a packet by using an outbound interface 2. The packet is a packet obtained after R1 performs filtering according to the forwarding rule of the first device. Based on the forwarding rules configured on R1 and R2, with reference to the network shown in FIG. 3, after R1 obtains the packet according to the forwarding rule of the first device, the packet may pass through the interface 1 of R1 and the interface 2 of R3, and reach the access router 1. No transmission abnormality occurs in the second device group, that is, the packet may be correctly sent to the access router 1 connected to the Web server, and the forwarding rule of the first device passes the rule check.

In the area D, the interface 1 of R1 is connected to R3, the interface 3 of R3 is connected to R4, and the interface 2 of R4 is connected to R1. The forwarding rule configured on R1 is: forwarding a packet by using the interface 1. The forwarding rule configured on R3 is: forwarding a packet by using the interface 3. The forwarding rule configured on R4 is: forwarding a packet by using the interface 2. The packet is a packet obtained after R1 performs filtering according to the forwarding rule of the first device. Based on the forwarding rules that are already configured on R1, R3, and R4, with reference to the network shown in FIG. 3, after R1 obtains the packet according to the forwarding rule of the first device, the packet may pass through the interface 1 of R1 and the interface 3 of R3, and reach R4. R4 sends, to R1 by using the interface 2 of R4, the packet from R3. R4 may cause a loop to form in the area D, and the packet cannot reach the access router 1 connected to the Web server, that is, the forwarding rule of the first device does not pass the rule check. The NaaS device may calibrate the forwarding rule configured on R4, for example, calibrate the forwarding rule configured on R4 to be sending the packet by using the interface 3.

Example Regarding the Blackhole Detection

When a transmission abnormality such as a loop and a blackhole occurs, eventually a packet cannot be correctly forwarded to the destination node. A difference lies in that: When a loop occurs, a packet is forwarded continuously and circularly; and when a blackhole occurs, a packet cannot be forwarded to another node.

For example, egress routers in the area D are R1 and R2, and aggregation routers are R3 and R4. In the area D, the interface 1 of R1 is connected to R3, the interface 3 of R3 is connected to R4, and the interface 2 of R4 is connected to R1. The forwarding rule configured on R1 is: forwarding a packet by using the interface 1. The forwarding rule configured on R3 is: forwarding a packet by using the interface 3. No forwarding rule is configured on R4. The packet is a packet obtained after R1 performs filtering according to the forwarding rule of the first device. Based on the forwarding rules that are already configured on R1 and R3, with reference to the network shown in FIG. 3, after R1 obtains the packet according to the forwarding rule of the first device, the packet may pass through the interface 1 of R1 and the interface 3 of R3, and reach R4. Because no forwarding rule is configured on R4, R4 cannot correctly forward the packet to the access router 1. R4 causes a blackhole to form in the area D, that is, the forwarding rule of the first device does not pass the rule check. The NaaS device needs to calibrate a forwarding rule of R4, for example, the NaaS device may configure, on R4, a forwarding rule of forwarding a packet by using the interface 3.

Optionally, another device, for example, R3, in the second device group may also cause a transmission abnormality, and details are not described herein example by example.

Optionally, in this embodiment of the present application, transmission abnormality detection may be performed on all devices in the second device group, or may be performed on some designated devices in the second device group, or may be performed on a device, on which a forwarding rule is being configured currently, in the second device group, which may be not specifically limited in this embodiment of the present application. For the device on which a forwarding rule is being configured currently, at least two following cases may be understood:

Case 1: A condition in an access contract includes at least two access communication requirements. For example, a first access communication requirement includes: a first rule and a first action, where the first rule includes a port whose number is 22 and the SSH protocol, and the first action is permitting access; and a second access communication requirement includes: a second rule and a second action, where the second rule includes a port being 80 and the Hypertext Transfer Protocol (HTTP), and the second action is permitting access. The NaaS device may separately obtain, for each access communication requirement according to the method in 101 to 104 in this embodiment of the present application, a first forwarding rule and information about a network device group that are corresponding to the communication requirement.

Case 2: The NaaS device currently receives access contracts that are input by at least two users, for example, an access contract 1 that is input by a user 1, where a condition in the access contract 1 includes: a first rule and a first action, where the first rule includes a port whose number is 22 and the SSH protocol, and the first action is permitting access; and an access contract 2 that is input by a user 2, where a condition in the access contract 2 includes: a second rule and a second action, where the second rule includes a port being 80 and the HTTP protocol, and the second action is permitting access. The NaaS device may obtain, according to the method in 101 to 104 in this embodiment of the present application, a first forwarding rule and information about a network device group that are corresponding to the contract 1, and a first forwarding rule and information about a network device group that are corresponding to the contract 2.

Optionally, to implement correct configuration of a service, the NaaS device may further perform duplicate name detection on a contract that is input by a user, to prevent different users from defining contracts by using a same name.

In a second implementation manner, an actual test is performed on service running of a device in a physical network by using the forwarding rule of the first device, to discover a service abnormality or perform fault location.

In an example, in this embodiment of the present application, an actual test may be at least be embodied as at least one of the following three aspects: rule validity, connectivity, or quality of service (QoS).

(1) Rule Validity

For example, after obtaining the forwarding rule of the first device and the information about first device, the NaaS device may send the forwarding rule of the first device and the information about first device to the Controller. The Controller may deliver the forwarding rule of the first device to the first device. After sending the forwarding rule of the first device and the information about first device to the Controller, the NaaS device may further perform an actual test on a status of configuring the forwarding rule of the first device by the first device, to ensure that the first device correctly configures the forwarding rule of the first device, that is, the forwarding rule of the first device already takes effect on the first device.

For example, after receiving the forwarding rule, delivered by the Controller, of the first device, the first device records a configuration status of the forwarding rule of the first device. The NaaS device may perform rule validity detection in the following manner: The NaaS device constructs a first detection packet, and sends the first detection packet to the first device. For example, the NaaS device may deliver the first detection packet to the first device by using the Controller. The first detection packet is used to request the first device to report the configuration status of the forwarding rule of the first device. The configuration status may be already taking effect or not taking effect. After receiving the first detection packet, the first device obtains the configuration status of the forwarding rule of the first device according to the first detection packet. The first device may obtain a first detection result packet according to the configuration status. The first device sends the first detection result packet to the NaaS device. For example, the first device sends the first detection result packet to the NaaS device by using the Controller.

(2) Connectivity

The NaaS device may further perform connectivity detection in the data center network shown in FIG. 3, and perform fault location on a device in the network. In an example, in this embodiment of the present application, the connectivity detection may be embodied as loop detection and/or blackhole detection.

Specifically, the NaaS device may calculate reachable address space and a path set by using a head space analysis (HSA) technology, and perform loop detection and/or blackhole detection based on the reachable address space and the path set. In this embodiment, the NaaS device performs loop detection and/or blackhole detection on the data center network. For the loop detection, the loop detection method in the rule check process may be used, and details are not described herein. For the blackhole detection, the blackhole detection method in the rule check process may be used, and details are not described herein. Optionally, if the NaaS device learns that a loop exists in the data center network, the NaaS device may further construct a second detection packet, and deliver the second detection packet to a path on which the loop exists. If the NaaS device learns that a blackhole exists in the data center network, the NaaS device may further construct a third detection packet, and deliver the third detection packet to a path on which the blackhole exists. The NaaS device may deliver the second detection packet or the third detection packet by using the Controller, and confirm, in a manner of an actual test, whether a loop and/or a blackhole exist/exists in a network.

(3) QoS

The NaaS device may further perform QoS detection on communication between any two devices in the network in the data center network shown in FIG. 3. In an example, in this embodiment of the present application, the QoS detection may include at least one of a bandwidth, a delay, jitter, or a packet loss rate.

Delay detection is used as an example to explain and describe a QoS detection process in this embodiment of the present application below.

The NaaS device constructs a fourth detection packet used to detect a delay from R1 to the access router 1, and forwards the fourth detection packet to R1 by using the Controller. Correspondingly, R1 receives the fourth detection packet sent by the Controller, and sends the fourth detection packet to the access router 1. The fourth detection packet sent by R1 to the access router 1 may include a sending timestamp recorded by R1. After receiving the fourth detection packet, the access router 1 may further record a receiving timestamp, and the access router 1 calculates a delay according to the sending timestamp and the receiving timestamp. The access router 1 obtains a fourth detection result packet. The fourth detection result packet includes the delay, and the access router 1 sends the fourth detection result packet to the NaaS device by using the Controller.

For detection of a parameter such as a bandwidth, jitter, or a packet loss rate, refer to the delay detection method. A corresponding detection packet is generated, and a detection result is obtained by using the corresponding detection packet. Details are not described herein example by example.

In addition, for the second implementation manner, this embodiment of the present application may be further described as follows: After obtaining a detection result, the NaaS device may directly feed back the detection result to a user. For example, that the forwarding rule of the first device already takes effect, which device causes a blackhole, or QoS between any two devices in the network is fed back to the user. The user performs subsequent processing according to the detection result. Alternatively, the NaaS device may further perform associated processing on an access contract according to the detection result and a preset condition. A process of the associated processing is explained and described below.

(a) For the rule validity detection, the preset condition may be that the forwarding rule of the first device does not take effect. If the first detection result packet received by the NaaS device denotes that the forwarding rule of the first device does not take effect, the NaaS device may determine that a detection result meets the preset condition, and needs to perform associated processing on the access contract. For example, the NaaS device may generate a parameter group <event, condition, action> according to the detection result and the preset condition, and adjust the access contract by using the parameter group. The event denotes an event on which associated processing is performed, and may be rule validity in this example. The condition denotes a condition of associated processing, that is, the preset condition, and in this example, may be that the forwarding rule of the first device does not take effect. The action denotes an action of associated processing, and in this example, may be: reselecting the information about the network device group, for example, selecting R2 in FIG. 3 as the first device, and sending the forwarding rule of the first device and information about R2 to the Controller; or sending the forwarding rule of the first device and the information about first device to the Controller again. For example, in the foregoing example, the first device is R1 in FIG. 3, and the forwarding rule of the first device and the information about R1 are sent to the Controller.

(b) For the connectivity detection, an example in which loop detection is performed by using the second detection packet is used. The preset condition may be that a loop occurs. If a second detection result packet received by the NaaS device denotes that a loop exists in the network, the NaaS device may determine that a detection result meets the preset condition, and needs to perform associated processing on the access contract. For example, the NaaS device may generate a parameter group <event, condition, action> according to the detection result and the preset condition, and adjust the access contract by using the parameter group. The event denotes an event on which associated processing is performed, and may be a loop in this example. The condition denotes a condition of associated processing, that is, the preset condition, and in this example, may be that a loop exists. The action denotes an action of associated processing, and in this example, may be modifying a forwarding rule of a device in which a loop occurs, for example, modifying the forwarding rule of R4 in the network shown in FIG. 3.

It should be noted that, a process of associated processing of a blackhole is similar to a process of associated processing of a loop, and details are not described herein. For a parameter group generated for a blackhole, an event may be a blackhole, a condition may be that a blackhole exists, and an action may be configuring a forwarding rule on a device in which the blackhole occurs.

(c) For the QoS detection, an example in which the delay detection is performed by using the fourth detection packet is used. The preset condition may be that a delay value is greater than a preset delay value. If the fourth detection result packet received by the NaaS device denotes that a delay value in an actual test is greater than the preset delay value, the NaaS device may determine that a detection result meets the preset condition, and needs to perform associated processing on the access contract. For example, the NaaS device may generate a parameter group <event, condition, action> according to the detection result and the preset condition, and adjust the access contract by using the parameter group. The event denotes an event on which associated processing is performed, and may be a delay in this example. The condition denotes a condition of associated processing, that is, the preset condition, and in this example, may be that a delay value is greater than the preset delay value. The action denotes an action of associated processing, and in this example, may be adjusting the preset delay value to a delay value in an actual test.

It should be noted that, a method of associated processing of a parameter such as a bandwidth, jitter, or a packet loss rate is similar to a method of associated processing of a delay, and details are not described herein. In a parameter group generated for a packet loss rate, an event may be a packet loss rate, a condition may be that a packet loos rate is greater than a preset packet loss rate, and an action may be adjusting the preset packet loss rate to a packet loss rate in an actual test. In a group parameter generated for jitter, an event may be jitter, a condition may be that a jitter value is greater than a preset jitter value, and an action may be adjusting the preset jitter value to a jitter value in an actual test. In a parameter group generated for bandwidth, an event may be bandwidth, a condition may be that a bandwidth a less than a preset bandwidth, and an action may be adjusting the preset bandwidth to a bandwidth in an actual test.

In addition, it should be noted that, the NaaS device may adjust the access contract when a detection result meets a requirement of the preset condition, so as to implement associated processing. Alternatively, the NaaS device may display a detection result to a user for viewing, and adjust the access contract only after receiving an indication from the user. Alternatively, the NaaS device may automatically adjust the access contract according to an indication when a detection result meets the preset condition, where the indication is set by a user and is used to perform associated processing. In an example, the user may set, when inputting the access contract in the NaaS device, an indication used to perform associated processing. For example, the indication used to perform associated processing is a coordination parameter. Specifically, when a value of the coordination parameter is Y, it denotes that associated processing needs to be performed, and when a value of the coordination parameter is N, it denotes that associated processing does not need to be performed. Alternatively, when the access contract includes the coordination parameter, it denotes that associated processing needs to be performed, and when the access contract does not include the coordination parameter, it denotes that associated processing does not need to be performed. In this embodiment of the present application, a condition for an NaaS device to perform associated processing, a manner in which a user sets an indication used to perform associated processing, and the like may be not specifically limited.

Embodiment 2

Figure 4:
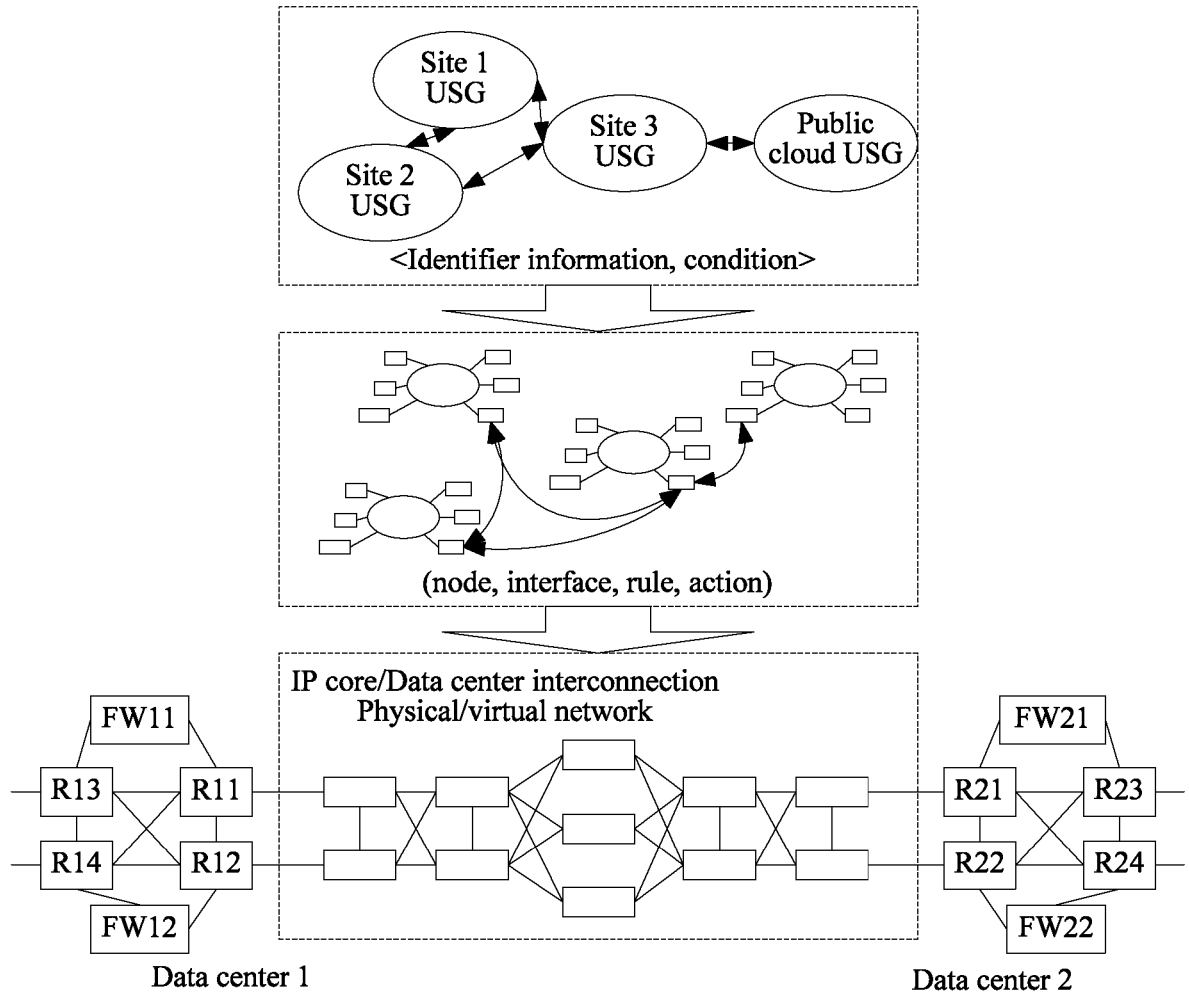
FIG. 4 is a schematic diagram of a scenario of implementing a bandwidth communication requirement service according to an embodiment of the present application.

Embodiment 2 is an embodiment related to a routing contract. An application scenario of Embodiment 2 may be an interconnection scenario in a data center. Devices in the interconnection scenario in the data center may be divided into the following USGs according to communication capabilities of the devices: a site USG, a public cloud USG, and the like. As shown in FIG. 4, a site 1 USG, a site 2 USG, and a site 3 USG may communicate with each other two by two, and the site 3 USG may communicate with a public cloud USG. In Embodiment 2, an example of implementing a requirement on communication between the site 1 USG and the site 2 USG is used for description. The communication requirement in in this example may be a transmission requirement of a path.

1. A user determines the site 1 USG and the site 2 USG according to a communication requirement.

For example, the user may determine the site 1 USG and the site 2 USG in this example with reference to the data center shown in FIG. 3. As shown in FIG. 4, the user defines some or all devices included in a data center 1 as the site 1 USG, and in this example, the site 1 USG may be a second identifier; the user defines some or all devices included in a data center 2 as the site 2 USG, and in this example, the site 2 USG may be a third identifier. FIG. 4 does not completely show network architectures of the data centers 1 and 2, and for the rest part, refer to FIG. 3.

2. An NaaS device obtains a routing contract.

For example, in the embodiment corresponding to FIG. 4, the routing contract may be denoted as <USG3, USG4, routing contract>. The USG3 may include an ID of the site 1 USG. The USG3 may further include an ID of a device included in a device group identified by the site 1 USG. Optionally, the USG3 may further include an ID of a Controller corresponding to the device group identified by the site 1 USG. The USG4 may include an ID of the site 2 USG and an ID of a device included in a device group identified by the site 2 USG. Optionally, the USG4 may further include an ID of a Controller corresponding to a device included in the site 2 USG. The routing contract is a requirement on communication between the device group identified by the site 1 USG and the device group identified by the site 2 USG, and may include a rule and an action, where the rule may include a bandwidth being 10 G and a delay being 10 ms, and the action may include setting QoS.

For example, the NaaS device may receive a routing contract that is input by a user in a manner of a command line, a Web interface, or the like. Alternatively, the NaaS device may further predefine description models of some routing contracts, and the NaaS device may automatically generate a routing contract according to a parameter that is input by the user and a predefined description model. In this embodiment of the present application, a specific manner in which the NaaS device obtains a routing contract may be not specifically limited.

For example, "us" in a command line that is input by the user may be an abbreviation of "user". The NaaS device may obtain the routing contract by using the following command lines that are input by the user:

(1) Create Classifier neutron classifier-create Routing-Control—ingress site1USG—egress site2USG (2) Create Routing Contract using the Classifier neutron contract-create Routing-Control-Contract—classifier Routing-Control—action QoS—bandwidth 10G—delay 10 ms—coordination Y (3) Create USG providing the Contract neutron usg-create site1USG—consumes-contract Routing-Control-Contract (4) Create User in site1USG neutron us-create—usg site1USG (5) Create USG providing the Contract neutron usg-create site2USG—consumes-contract Routing-Control-Contract (6) Create User in site2USG neutron us-create—usg site2USG 3. The NaaS device obtains information about a network device group.

For example, that the NaaS device obtains information about a network device group may include: The NaaS device obtains a third device group corresponding to the site 1 USG, where the third device group includes a device used as a source node, the NaaS device selects a third device from the third device group according to the condition, where the third device is the source node, and the NaaS device obtains information about the third device; and the NaaS device obtains a fourth device group corresponding to the site 2 USG, where the fourth device group includes a device used as a destination node, the NaaS device selects a fourth device from the fourth device group according to the condition, where the fourth device is the destination node, and the NaaS device obtains information about the fourth device. For example, the source node in this example may be a source node of a path between the third device group and the fourth device group, and the destination node may be a destination node of the path; or the source node in this example may be a node that sends a packet, and the destination node may be a node that receives the packet.

Alternatively, that the NaaS device obtains information about a network device group may include: The NaaS device reads a locally saved third device group, the NaaS device may traverse the third device group, and select, from the third device group, a third device that meets the site 1 USG and the condition, and the NaaS device obtains information about the third device; and the NaaS device reads a locally saved fourth device group, the NaaS device may traverse the fourth device group, and select, from the fourth device group, a fourth device that meets the site 2 USG and the condition, and the NaaS device obtains information about the fourth device.

In this example, the third device group and the fourth device group belong to a candidate device group, and the third device and the fourth device belong to the network device group.

For example, the NaaS device may obtain the third device group according to the site 1 USG, and obtain the fourth device group according to the site 2 USG. In this embodiment of the present application, composition of the third device group and the fourth device group may be not specifically limited, the third device group includes at least a device that can communicate with a device outside the data center 1, and the fourth device group includes at least a device that can communicate with a device outside the data center 2. For a manner in which the NaaS device obtains the third device group and the fourth device group, refer to the implementation manner for obtaining a second device group in Embodiment 1, and details are not described herein.

After obtaining the third device group, the NaaS device may select the third device from the third device group according to the condition. For a manner in which the NaaS device selects the third device, refer to the implementation manner for selecting a first device in Embodiment 1, and details are not described herein. For example, the NaaS device may obtain an identifier of the selected third device and an interface of the third device, and use the obtained identifier and interface as the information about the third device.

After obtaining the fourth device group, the NaaS device may select the fourth device from the fourth device group according to the condition. For a manner in which the NaaS device selects the fourth device, refer to the implementation manner for selecting a first device in Embodiment 1, and details are not described herein. For example, the NaaS device may obtain an identifier of the selected fourth device and an interface of the fourth device, and use the obtained identifier and interface as the information about the fourth device.

4. The NaaS device obtains a first forwarding rule.

For example, the NaaS device obtains a second match field and a second action from the condition of the routing contract, where the second match field corresponds to the requirement on communication between the device group identified by the second identifier and the device group identified by the third identifier, and the second action corresponds to communication between the device group identified by the second identifier and the device group identified by the third identifier; and the NaaS device generates a forwarding rule of the third device and a forwarding rule of the fourth device according to the second match field and the second action. The first forwarding rule includes the forwarding rule of the third device and the forwarding rule of the fourth device.

For example, the second match field corresponds to the condition in the routing contract, and may include at least one of QoS, a virtual private network (VPN) label, or a committed access rate (CAR). For example, a bandwidth is 10 M, and the bandwidth belongs to QoS. The second action corresponds to the communication operation, and may include at least one of setting QoS or setting a VPN.

For example, if the condition in the routing contract is a bandwidth requirement between the third device group and the fourth device group, the forwarding rule of the third device and the forwarding rule of the fourth device may be denoted as: enabling an MPLS-TE configuration, that is, mpls te bandwidth max-reservable-bandwidth 100000000. Optionally, if the information about the selected third device includes R11 and an interface 1, the forwarding rule of the third device may be further denoted as: enabling an MPLS-TE configuration, and enabling a bandwidth constraint configuration on the interface 1, that is, mpls te bandwidth max-reservable-bandwidth 100000000. If the information about the selected fourth device includes R22 and the interface1, the forwarding rule of the fourth device may be further denoted as: enabling an MPLS-TE configuration, and enabling a bandwidth constraint configuration on the interface1, that is, mpls te bandwidth max-reservable-bandwidth 100000000.

5. The NaaS device delivers the first forwarding rule and the information about the network device group to a Controller.

In this example, a parameter group (node, interface, rule, action) delivered by the NaaS device to the Controller may be denoted as (R11; interface1; enable an MPLS-TE configuration, mpls te bandwidth max-reservable-bandwidth 100000000; set QoS) and (R22; interface1; enable an MPLS-TE configuration, mpls te bandwidth max-reservable-bandwidth 100000000; set QoS).

Optionally, after receiving the first forwarding rule and the information about the network device group that are sent by the NaaS device, the Controller may obtain a path between a source node R11 and a destination node R22, and perform bandwidth constraint configuration on nodes on the path according to a bandwidth requirement. For example, the path further includes forwarding nodes R3 and R4, and the Controller may separately perform bandwidth constraint configuration on R11, R22, R3, and R4.

Optionally, this embodiment of the present application further provides two implementation manners of a rule check, which are described below by using examples.

In a first implementation manner, a rule check is performed on the first forwarding rule. The performing a rule check on the first forwarding rule may be performing a rule check on the network device group, or performing a rule check between the network device group and another device in the candidate device group.

(1) The performing a rule check on the network device group includes:

(a) The NaaS device performs a conflict check on the forwarding rule of the third device and a fourth forwarding rule, where the fourth forwarding rule is a forwarding rule that is already configured on the third device. If a conflict exists, that is, the forwarding rule of the third device does not pass the rule check, the NaaS device calibrates the forwarding rule of the third device, and obtains a calibrated forwarding rule of the third device. The first forwarding rule includes the forwarding rule of the fourth device and the calibrated forwarding rule of the third device.

(b) The NaaS device performs a conflict check on the forwarding rule of the fourth device and a fifth forwarding rule, where the fifth forwarding rule is a forwarding rule that is already configured on the fourth device. If a conflict exists, that is, the forwarding rule of the fourth device does not pass the rule check, the NaaS device calibrates the forwarding rule of the fourth device, and obtains a calibrated forwarding rule of the fourth device. The first forwarding rule includes the forwarding rule of the third device and the calibrated forwarding rule of the fourth device.

(c) The NaaS device performs a rule check on the forwarding rule of the third device according to the method shown in (a), and further performs a rule check on the forwarding rule of the fourth device according to the method shown in (b). If neither the forwarding rule of the third device nor the forwarding rule of the fourth device passes the rule check, the NaaS device calibrates the forwarding rule of the third device and the forwarding rule of the fourth device. The first forwarding rule may include a calibrated forwarding rule of the third device and a calibrated forwarding rule of the fourth device.

For example, a rule conflict in this example may be: For the third device R11, if the fourth forwarding rule is that a packet is forwarded to a router R3 via an interface2, the forwarding rule of the third device is that a packet is forwarded to the router R3 via the interface1. In an application process, a case in which another rule conflict occurs may also exist, and details are not described herein example by example. For a method by using which the NaaS device resolves a rule conflict, refer to the method used above when a forwarding rule of the first device conflicts with the second forwarding rule, and details are not described herein.

(2) The performing a rule check between the network device group and another device in the candidate device group includes:

(a) The NaaS device determines whether the forwarding rule of the third device and a forwarding rule of a fifth device in the third device group form a transmission abnormality. If a transmission abnormality is formed, the NaaS device obtains a sixth forwarding rule, and the NaaS device sends the forwarding rule of the third device and the information about the third device to the Controller. If no transmission abnormality is formed, the NaaS device sends the forwarding rule of the third device and the information about the third device to the Controller. For example, the sixth forwarding rule may be a forwarding rule obtained after the NaaS device calibrates the forwarding rule of the fifth device. The fifth device may directly communicate with the third device, or the fifth device may indirectly communicate with the third device.

(b) The NaaS device determines whether the forwarding rule of the fourth device and a forwarding rule of a sixth device in the fourth device group form a transmission abnormality. If a transmission abnormality is formed, the NaaS device obtains a seventh forwarding rule, and the NaaS device sends the forwarding rule of the fourth device and the information about the fourth device to the Controller. If no transmission abnormality is formed, the NaaS device sends the forwarding rule of the fourth device and the information about the fourth device to the Controller. For example, the seventh forwarding rule may be a forwarding rule obtained after the NaaS device calibrates the forwarding rule of the sixth device. The sixth device may directly communicate with the fourth device, or the sixth device may indirectly communicate with the fourth device.

(c) The NaaS device performs a rule check in the third device group according to the method shown in (a), and further performs a rule check in the fourth device group according to the method shown in (b). If a transmission abnormality exists in both the third device group and the fourth device group, the NaaS device obtains the sixth forwarding rule and the seventh forwarding rule separately.

For example, the transmission abnormality may be a case such as a loop or a blackhole because of which a packet cannot be correctly forwarded to a destination node. For a manner for detecting a transmission abnormality, refer to the foregoing process of performing loop detection and blackhole detection in the second device group, and details are not described herein.

In a second implementation manner, an actual test is performed on service running of a device in a physical network by using the first forwarding rule, to discover a service abnormality or perform fault location.

In an example, in this embodiment of the present application, an actual test may be at least embodied as at least one of the following three aspects: rule validity, connectivity, or QoS.

(1) Rule validity (a) The NaaS device constructs a fifth detection packet, and delivers the fifth detection packet to the third device by using the Controller, where the fifth detection packet is used to request the third device to report a configuration status of the forwarding rule of the third device, and the configuration status may be already taking effect or not taking effect. After receiving the fifth detection packet, the third device obtains the configuration status of the forwarding rule of the third device according to the fifth detection packet. The third device may obtain a fifth detection result packet according to the configuration status, and send the fifth detection result packet to the NaaS device by using the Controller.

(b) The NaaS device constructs a sixth detection packet, and delivers the sixth detection packet to the fourth device by using the Controller, where the sixth detection packet is used to request the fourth device to report a configuration status of the forwarding rule of the fourth device, and the configuration status may be already taking effect or not taking effect. After receiving the sixth detection packet, the fourth device obtains the configuration status of the forwarding rule of the fourth device according to the sixth detection packet. The fourth device may obtain a sixth detection result packet according to the configuration status, and send the sixth detection result packet to the NaaS device by using the Controller.

(c) The NaaS device performs validity detection on the forwarding rule of the third device according to the method shown in (a), and further performs validity detection on the forwarding rule of the fourth device according to the method shown in (b).

(2) Connectivity

The NaaS device may further perform connectivity detection in the network shown in FIG. 4, and perform fault location on a device in the network. In an example, in this embodiment of the present application, the connectivity detection may be loop detection and/or blackhole detection. For a connectivity detection method in this example, refer to the method used when connectivity detection is performed in the data center network shown in FIG. 3 in Embodiment 1, and details are not described herein. In this example, the NaaS device may perform connectivity detection on at least one network of the data center 1, the data center 2, or the Internet.

(2) QoS

The NaaS device may further perform QoS detection between any two devices of an egress router R11, an egress router R22, and a device in the Internet in the network shown in FIG. 4. In an example, in this embodiment of the present application, the QoS detection may include at least one of a bandwidth, a delay, jitter, or a packet loss rate. For a QoS detection method in this example, refer to the method used when QoS detection is performed in the data center network shown in FIG. 3 in Embodiment 1, and details are not described herein.

Optionally, after obtaining a detection result, the NaaS device may further perform associated processing on the routing contract by using the detection result and a preset condition. For a method by using which the NaaS device performs associated processing on the routing contract, refer to the implementation manner of associated processing in Embodiment 1, and details are not described herein.

Embodiment 3

Figure 5:
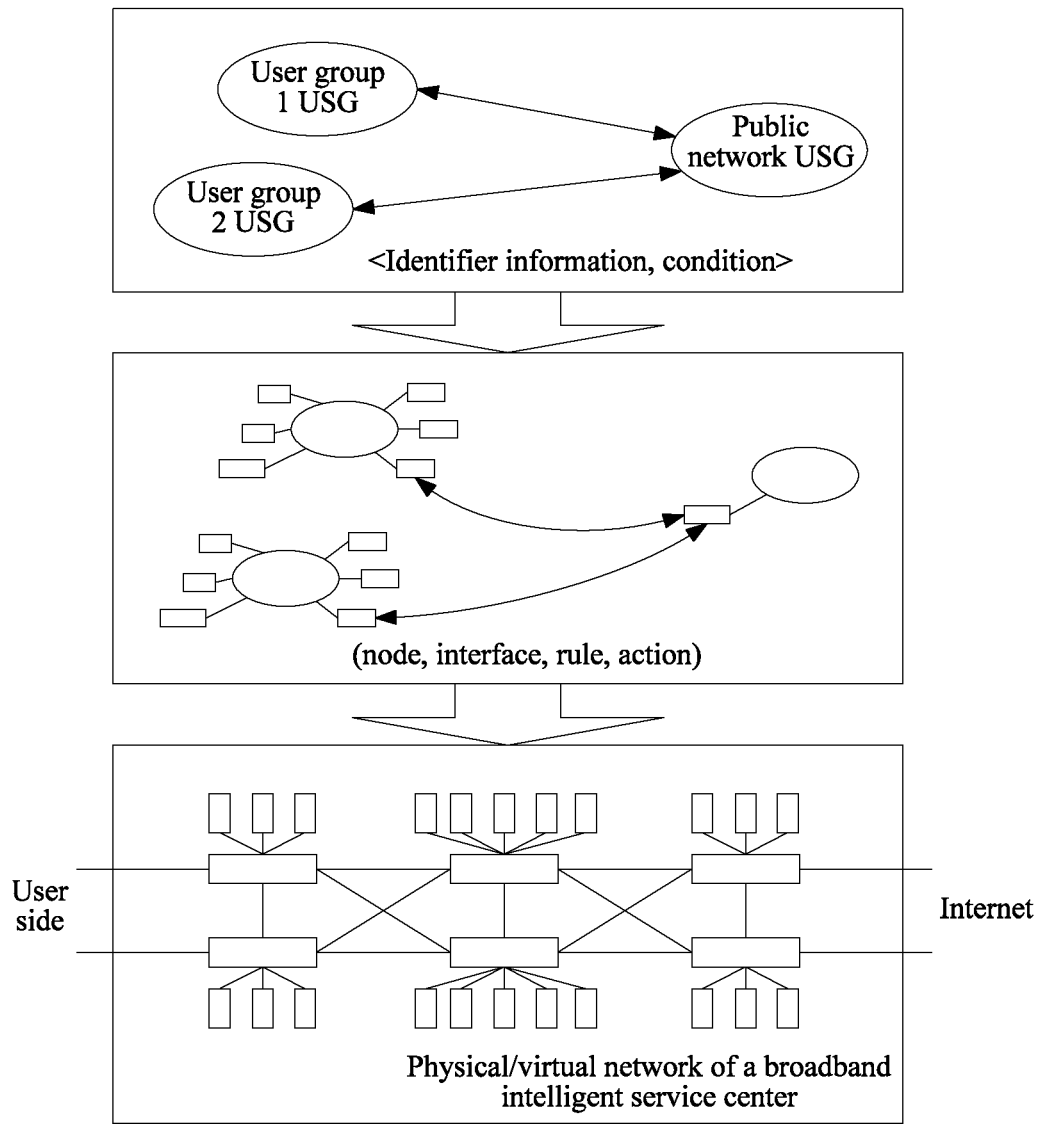
FIG. 5 is a schematic diagram of a scenario of implementing a VPN service according to an embodiment of the present application.

Embodiment 3 is another embodiment related to a routing contract. An application scenario of Embodiment 3 may be a scenario of a broadband intelligent service. Devices in a network of the broadband intelligent service may be divided into the following USGs according to communication capabilities of the devices: a user group USG, a public network USG, and the like. As shown in FIG. 5, a user group 1 USG may communicate with a public network USG, and a user group 2 USG may communicate with the public network USG. In Embodiment 3, an example of implementing communication between the user group 1 USG and the user group 2 USG is used for description. In this example, a communication requirement may be creating a VPN.

1. An NaaS device obtains a routing contract.

For example, in the embodiment corresponding to FIG. 5, the routing contract may be denoted as <USG3, USG4, routing contract>. The USG3 may include an ID of the user group 1 USG. The USG3 may further include an ID of a device included in a device group identified by the user group 1 USG. Optionally, the USG3 may further include an ID of a Controller corresponding to a device included in the user group 1 USG. The USG4 may include an ID of the user group 2 USG. The USG4 may further include an ID of a device included in a device group identified by the user group 2 USG. Optionally, the USG4 may further include an ID of a Controller corresponding to a device included in the user group 2 USG. The routing contract may include a rule and an action, where the rule may include a VPN label being 100, and the action may include setting a VPN.

For example, the NaaS device may receive a routing contract that is input by a user in a manner of a command line, a Web interface, or the like. Alternatively, the NaaS device may further predefine description models of some routing contracts, and the NaaS device may automatically generate a routing contract according to a parameter that is input by the user and a predefined description model. In this embodiment of the present application, a specific manner in which the NaaS device obtains a routing contract may be not specifically limited.

For example, "us" in a command line that is input by the user may be an abbreviation of "user". The NaaS device may obtain the routing contract by using the following command lines that are input by the user:

(1) Create Classifier neutron classifier-create VPN-Control—ingress user group 1 USG—egress user group 2 USG (2) Create Routing Contract using the Classifier neutron contract—create VPN—Control-Contract—classifier VPN—Control—action MARK—vpnlable 100

(3) Create USG providing the Contract neutron usg-create user group 1 USG—consumes-contract VPN-Control-Contract (4) Create User in user group 1 USG neutron us-create—usg user group 1 USG (5) Create USG providing the Contract neutron usg-create user group 2 USG—consumes-contract VPN-Control-Contract (6) Create User in user group 2 USG neutron us-create—usg user group 2 USG 2. The NaaS device obtains information about a network device group.

For example, that the NaaS device obtains information about a network device group may include: The NaaS device obtains a candidate device group according to the user group 1 USG and the user group 2 USG in the routing contract; the NaaS device selects the network device group from the candidate device group according to a condition in the routing contract; and the NaaS device obtains the information about the network device group.

For a manner in which the NaaS device obtains the candidate device group, refer to the implementation manner for obtaining a third device group and a fourth device group in Embodiment 2, and details are not described herein. For a manner in which the NaaS device selects the network device group, refer to the implementation manner for selecting a third device and a fourth device in Embodiment 2, and details are not described herein. For a manner in which the NaaS device obtains the information about the network device group, refer to the implementation manner for obtaining information about the third device and information about the fourth device in Embodiment 2, and details are not described herein.

For example, the information (node, interface) of the selected network device group may be denoted as: (R1, interface1) and (R2, interface1).

3. The NaaS device obtains a first forwarding rule.

In this embodiment of the present application, the first forwarding rule may be obtained after the condition in the routing contract is converted.

For example, the first forwarding rule may be denoted as a VPN configuration. The first forwarding rule may include a forwarding rule for R1 and a forwarding rule for R2. The forwarding rule for R1 may be: enabling a VPN global configuration, that is, mpls static-l2vc destination user group 2 USG transmit-vpn-label 100 receive-vpn-label 100; and the forwarding rule for R2 may be: enabling a VPN global configuration, that is, mpls static-l2vc destination user group 1 USG transmit-vpn-label 100 receive-vpn-label 100. Optionally, the forwarding rule for R1 may be further denoted as enabling a VPN global configuration, and enabling a VPN label on the interface 1, that is, mpls static-l2vc destination user group 2 USG transmit-vpn-label 100 receive-vpn-label 100; and the forwarding rule for R2 may be denoted as: enabling a VPN global configuration, and enabling a VPN label on the interface 1, that is, mpls static-l2vc destination user group 1 USG transmit-vpn-label 100 receive-vpn-label 100.

4. The NaaS device delivers the first forwarding rule and the information about the network device group to a Controller.

In this example, (node, interface, rule, action) delivered by the NaaS device to the Controller may be denoted as (R1; interface1; enable VPN global configuration, mpls static-l2vc destination user group 2 USG transmit-vpn-label 100 receive-vpn-label 100; set VPN) and (R2; interface1; enable VPN global configuration, mpls static-l2vc destination user group 2 USG transmit-vpn-label 100 receive-vpn-label 100; set VPN).

Optionally, after obtaining the first forwarding rule, the NaaS device may further perform a rule check on the obtained first forwarding rule. For example, in this embodiment of the present application, a rule check may be performed on the first forwarding rule in two implementation manners. In a first implementation manner, the NaaS device performs a rule check on the first forwarding rule; and in a second implementation manner, the NaaS device performs an actual test on service running of a device in a physical network by using the first forwarding rule. For a rule check method, refer to the implementation manners of a rule check in Embodiment 1 and Embodiment 2, and details are not described herein.

Embodiment 4

Figure 6:
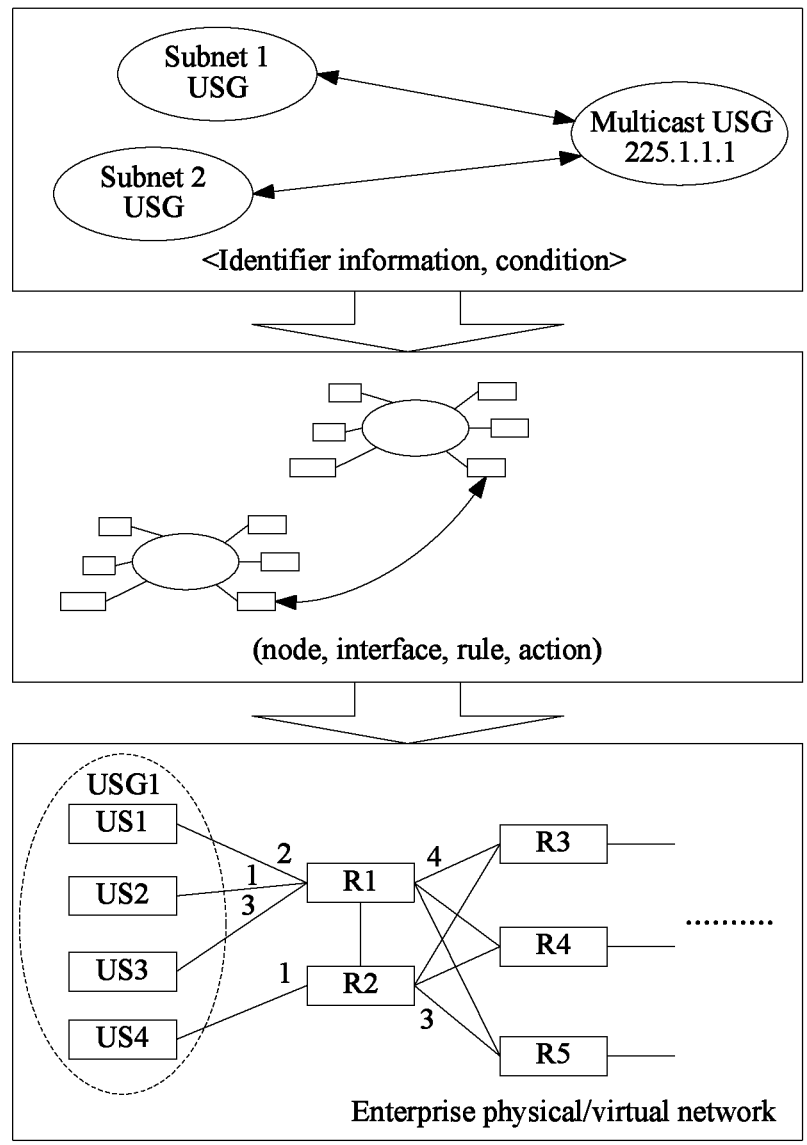
FIG. 6 is a schematic diagram of a scenario of implementing a multicast service according to an embodiment of the present application.

Embodiment 4 is an embodiment related to a multicast contract. An application scenario of Embodiment 4 may be a scenario of an enterprise network. Devices in the enterprise network may be divided into the following USGs according to network segments: a subnet USG, a multicast USG, and the like. For example, network segments may be divided in a manner of a department, an office area, or the like. As shown in FIG. 6, a subnet 1 USG may communicate with a multicast USG, and a subnet 2 USG may communicate with the multicast USG. In Embodiment 4, an example of implementing a communication requirement for the subnet 1 USG to join the multicast USG is used for description. In this example, the subnet 1 USG may be a fourth identifier, and the multicast USG may be a fifth identifier.

1. An NaaS device obtains a multicast contract.

For example, in the embodiment corresponding to FIG. 6, the multicast contract may be denoted as <USG5, USG multicast, multicast contract>. The USG5 may include an ID of the subnet 1 USG. The USG5 further includes an ID of a device included in a device group identified by the subnet 1 USG. Optionally, the USG5 may further include an ID of a Controller corresponding to a device included in the subnet 1 USG. The USG multicast is used to identify a multicast group, for example, identify a multicast group whose address is 225.1.1.1. The multicast contract is a communication requirement for the subnet 1 USG to join a multicast group, and may include a rule and an action, where the rule may include an address of a multicast group being 225.1.1.1, and the action may include joining a multicast group.

For example, the NaaS device may receive a multicast contract that is input by a user in a manner of a command line, a Web interface, or the like. Alternatively, the NaaS device may further predefine description models of some multicast contracts, and the NaaS device may automatically generate a multicast contract according to a parameter that is input by the user and a predefined description model. In this embodiment of the present application, a specific manner in which the NaaS device obtains a multicast contract may be not specifically limited.

For example, "us" in a command line that is input by the user may be an abbreviation of "user". The NaaS device may obtain the multicast contract by using the following command lines that are input by the user:

(1) Create Classifier neutron classifier-create Multicast—direction BI (2) Create action neutron policy-action-create allow—action-type allow (3) Create rule neutron policy-rule-create allow-multicast—classifier Multicast—action allow (4) Create contract neutron contract-create Multicast-contract—policy-rules allow-multicast (5) Create USG providing the Contract neutron usg-create 225.1.1.1—provides-contract Multicast-Contract neutron use-create subnet 1 USG—consumed-contract Multicast-Contract (6) Create User in subnet 1 USG neutron us-create us1-usg subnet 1 USG neutron us-create us2-usg subnet 1 USG neutron us-create us3-usg subnet 1 USG
neutron us-create us4-usg subnet 1 USG 2. The NaaS device obtains information about a network device group.

For example, that the NaaS device obtains information about a network device group may include: The NaaS device obtains a fifth device group corresponding to the subnet 1 USG, where the fifth device group includes a device that communicates with the device group identified by the subnet 1 USG; the NaaS device selects a seventh device from the fifth device group according to a condition, where the seventh device communicates with the device group identified by the fourth identifier; and the NaaS device obtains information about the seventh device. Alternatively, that the NaaS device obtains information about a network device group may include: the NaaS device reads a locally saved fifth device group; the NaaS device may traverse the fifth device group, and select, from the fifth device group, a seventh device that meets the subnet 1 USG and a condition; and the NaaS device obtains information about the seventh device. The fifth device group belongs to a candidate device group, and the seventh device belongs to the network device group.

For example, the NaaS device may obtain the fifth device group according to the subnet 1 USG. The fifth device group may include forwarding devices R1 and R2 in the network shown in FIG. 6, or the fifth device group may include forwarding devices R1, R2, R3 and R4 in the network shown in FIG. 6, or the fifth device group may include all devices in the network shown in FIG. 6. In this embodiment of the present application, composition of the fifth device group may be not specifically limited, and in this embodiment of the present application, the fifth device group includes at least a device that can communicate with the device group identified by the subnet 1 USG.

After obtaining the fifth device group, the NaaS device may select the seventh device from the fifth device group according to the condition. For a manner in which the NaaS device selects the seventh device, refer to the implementation manner for selecting a first device in Embodiment 1, and details are not described herein. For example, the NaaS device may obtain an identifier of the seventh device and an interface of the seventh device, and use the obtained identifier and interface as the information about the seventh device. For example, with reference to a network shown in FIG. 7, the information about the seventh device (node, interface) may be denoted as: (R1, interface2), (R1, interface1), (R1, interface3), and (R2, interface1).

3. The NaaS device obtains a first forwarding rule.

For example, that the NaaS device obtains a first forwarding rule may include: The NaaS device obtains a third match field and a third action from the condition, where the third match field corresponds to a communication requirement for the device group identified by the fourth identifier to join the multicast group identified by the fifth identifier, and the third action corresponds to a multicast operation; and the NaaS device generates a forwarding rule of the seventh device according to the third match field and the third action.

For example, the third match field corresponds to the condition in the multicast contract, and may include an address of a multicast group, for example, an address of a multicast group being 225.1.1.1. The third action corresponds to a multicast operation, and may include joining a multicast group or exiting a multicast group.

For example, the forwarding rule of the seventh device may be denoted as a multicast enabling configuration. The forwarding rule of the seventh device may include a forwarding rule for R1 and a forwarding rule for R2. The forwarding rule for R1 may be denoted as: enabling a multicast function on R1, and statically adding R1 to a multicast group 225.1.1.1; the forwarding rule for R2 may be: enabling a multicast function on R2, and statically adding R2 to a multicast group 225.1.1.1. Optionally, the forwarding rule for R1 may be further denoted as: enabling a multicast function on R1, enabling a protocol independent multicast-sparse mode (PIM-SM) function on interfaces 1, 2, 3, and 4, enabling an Internet Group Management Protocol (IGMP) function on interfaces 1, 2, and 3 connected to terminals, and statically adding the interfaces 1, 2, and 3 of R1 to a multicast group 225.1.1.1; the forwarding rule for R2 may be further denoted as: enabling a multicast function on R2, enabling a PIM-SM function on the interfaces 1 and 3, enabling an IGMP function on the interface1 connected to a terminal, and statically adding the interface1 of R2 to a multicast group 225.1.1.1.

4. The NaaS device delivers the first forwarding rule and the information about the network device group to a Controller.

In this example, (node, interface, rule, action) delivered by the NaaS device to the Controller may be denoted as (R1; interface2; enable a multicast function on R1, and statically add R1 to a multicast group 225.1.1.1; join multicast group), (R1; interface1; enable a multicast function on R1, and statically add R1 to a multicast group 225.1.1.1; join multicast group), (R1; interface3; enable a multicast function on R1, and statically add R1 to a multicast group 225.1.1.1; join multicast group), and (R2; interface1; enable a multicast function on R2, and statically add R2 to a multicast group 225.1.1.1; join multicast group). The join multicast group denotes joining a multicast group.

Optionally, after obtaining the forwarding rule of the seventh device, the NaaS device may further perform a rule check on the obtained forwarding rule of the seventh device. For example, in this embodiment of the present application, the rule check may be performed on the forwarding rule of the seventh device in the following two implementation manners.

In a first implementation manner, the NaaS device performs a rule check on the forwarding rule of the seventh device. The performing a rule check on the forwarding rule of the seventh device may be performing a rule check on the seventh device, or performing a rule check between the seventh device and another device in the fifth device group.

(1) The performing a rule check on the seventh device includes:

The NaaS device performs a conflict check on the forwarding rule of the seventh device and an eighth forwarding rule, where the eighth forwarding rule is a forwarding rule that is already configured on the seventh device. If a conflict exists, that is, the forwarding rule of the seventh device does not pass the rule check, the NaaS device obtains a calibrated forwarding rule of the seventh device, and sends the calibrated forwarding rule of the seventh device and the information about the seventh device to the Controller. If a conflict does not exist, that is, the forwarding rule of the seventh device passes the rule check, the NaaS device sends the forwarding rule of the seventh device and the information about the seventh device to the Controller.

(2) The performing a rule check between the seventh device and another device in the fifth device group includes:

The NaaS device determines whether the forwarding rule of the seventh device and a forwarding rule of an eighth device in the fifth device group form a transmission abnormality. If a transmission abnormality is formed, the NaaS device obtains a ninth forwarding rule, and the NaaS device sends the forwarding rule of the seventh device and the information about the seventh device to the Controller. If no transmission abnormality is formed, the NaaS device sends the forwarding rule of the seventh device and the information about the seventh device to the Controller. For example, the ninth forwarding rule may be a calibrated forwarding rule of the eighth device. For example, the NaaS device may calibrate the forwarding rule of the eighth device, to obtain a calibrated forwarding rule of the eighth device. The eighth device may directly communicate with the seventh device, or the eighth device may indirectly communicate with the seventh device.

For example, the transmission abnormality may be a case such as a loop or a blackhole because of which a packet cannot be correctly forwarded to a destination node. For a manner for detecting a transmission abnormality, refer to the foregoing process of performing loop detection and blackhole detection in the second device group, and details are not described herein.

In a second implementation manner, the NaaS device performs an actual test on service running of a device in a physical network by using the forwarding rule of the seventh device, to discover a service abnormality or perform fault location.

In an example, in this embodiment of the present application, an actual test may be at least embodied as at least one of the following three aspects: rule validity, connectivity, or QoS. For a process of an actual test, refer to the implementation manner of the actual test in Embodiment 1 above, and details are not described herein.

Optionally, after obtaining a detection result, the NaaS device may further perform associated processing on the multicast contract by using the detection result and a preset condition. For a method by using which the NaaS device performs associated processing on the multicast contract, refer to the implementation manner of associated processing in Embodiment 1, and details are not described herein.

Optionally, in the foregoing embodiments of the present application, if the contract further includes a service type, after receiving the contract, the NaaS device may determine a type of the contract according to a type identified by the service type. For example, if the service type is access, and the contract is an access contract; if the service type is routing, and the contract is a routing contract; and if the service type is multicast, and the contract is the multicast contract. The service type may be further another extendable type, and details are not described herein example by example.

Figure 7:
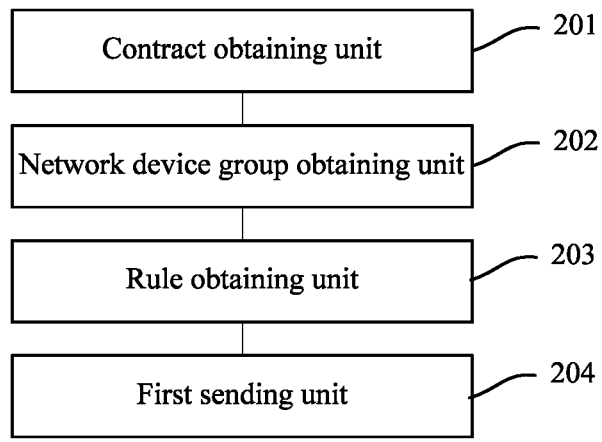
FIG. 7 is a schematic diagram of an apparatus for configuring a service according to an embodiment of the present application.

Corresponding to the method in FIG. 1, an embodiment of the present application further provides an apparatus for configuring a service. The apparatus for configuring a service may be disposed on an Naas device or a Controller, or may be disposed on another device, and details are not described herein example by example. The apparatus for configuring a service may execute the method provided in any one of the embodiments corresponding to FIG. 1 to FIG. 6. As shown in FIG. 7, the apparatus may include:

a contract obtaining unit 201, configured to obtain a contract of a service, where the contract includes identifier information and a condition, the identifier information is used to identify a first device group, the first device group includes a device that provides the service, and the condition is a communication requirement corresponding to the service;

a network device group obtaining unit 202, configured to obtain information about a network device group according to the identifier information and the condition;

a rule obtaining unit 203, configured to obtain a first forwarding rule according to the condition, where the first forwarding rule corresponds to the network device group; and a first sending unit 204, configured to send the first forwarding rule and the information about the network device group to a controller.

Optionally, the identifier information is a first identifier, and the condition is a communication requirement for accessing a device group identified by the first identifier;

the network device group obtaining unit is specifically configured to obtain a second device group corresponding to the first identifier, where the second device group includes a device that meets the communication requirement;

the network device group obtaining unit is specifically configured to select a first device from the second device group according to the communication requirement for accessing the device group identified by the first identifier; and the network device group obtaining unit is specifically configured to obtain information about the first device, where the information about the first device includes an identifier of the first device and an interface of the first device.

Optionally, the rule obtaining unit is specifically configured to obtain a first match field and a first action from the condition, where the first match field corresponds to the communication requirement for accessing the device group identified by the first identifier, and the first action corresponds to an access operation; and the rule obtaining unit is specifically configured to generate a forwarding rule of the first device according to the first match field and the first action.

Optionally, the rule obtaining unit is further configured to perform a conflict check on the forwarding rule of the first device and a second forwarding rule, where the second forwarding rule is a forwarding rule that is already configured on the first device; and if the forwarding rule of the first device conflicts with the second forwarding rule, the rule obtaining unit is configured to calibrate the forwarding rule of the first device, to obtain a calibrated forwarding rule of the first device.

Optionally, the rule obtaining unit is further configured to determine whether the forwarding rule of the first device and a forwarding rule of a second device in the second device group form a transmission abnormality; and if the forwarding rule of the first device and the forwarding rule of the second device in the second device group form a transmission abnormality, the rule obtaining unit is configured to obtain a third forwarding rule, where the third forwarding rule is a forwarding rule obtained after the forwarding rule of the second device is calibrated.

Optionally, the identifier information includes a second identifier and a third identifier, and the condition is a requirement on communication between a device group identified by the second identifier and a device group identified by the third identifier;

the network device group obtaining unit is specifically configured to obtain a third device group corresponding to the second identifier and a fourth device group corresponding to the third identifier, where the third device group includes a device used as a source node, and the fourth device group includes a device used as a destination node;

the network device group obtaining unit is specifically configured to select a third device from the third device group according to the requirement on communication between the device group identified by the second identifier and the device group identified by the third identifier, where the third device is the source node;

the network device group obtaining unit is specifically configured to select a fourth device from the fourth device group according to the requirement on communication between the device group identified by the second identifier and the device group identified by the third identifier, where the fourth device is the destination node; and the network device group obtaining unit is specifically configured to obtain information about the third device and information about the fourth device, where the information about the third device includes an identifier of the third device and an interface of the third device, and the information about the fourth device includes an identifier of the fourth device and an interface of the fourth device.

Optionally, the rule obtaining unit is specifically configured to obtain a second match field and a second action from the condition, where the second match field corresponds to the requirement on communication between the device group identified by the second identifier and the device group identified by the third identifier, and the second action corresponds to communication between the device group identified by the second identifier and the device group identified by the third identifier; and the rule obtaining unit is specifically configured to generate a forwarding rule of the third device and a forwarding rule of the fourth device according to the second match field and the second action.

Optionally, the rule obtaining unit is further configured to perform a conflict check on the forwarding rule of the third device and a fourth forwarding rule, where the fourth forwarding rule is a forwarding rule that is already configured on the third device; and if the forwarding rule of the third device conflicts with the fourth forwarding rule, the rule obtaining unit is configured to calibrate the forwarding rule of the third device, to obtain a calibrated forwarding rule of the third device.

Optionally, the rule obtaining unit is further configured to perform a conflict check on the forwarding rule of the fourth device and a fifth forwarding rule, where the fifth forwarding rule is a forwarding rule that is already configured on the fourth device; and if the forwarding rule of the fourth device conflicts with the fifth forwarding rule, the rule obtaining unit is configured to calibrate the forwarding rule of the fourth device, to obtain a calibrated forwarding rule of the fourth device.

Optionally, the rule obtaining unit is further configured to determine whether the forwarding rule of the third device and a forwarding rule of a fifth device in the third device group form a transmission abnormality; and if the forwarding rule of the third device and the forwarding rule of the fifth device in the third device group form a transmission abnormality, the rule obtaining unit is configured to obtain a sixth forwarding rule, where the sixth forwarding rule is a forwarding rule obtained after the forwarding rule of the fifth device is calibrated.

Optionally, the rule obtaining unit is further configured to determine whether the forwarding rule of the fourth device and a forwarding rule of a sixth device in the fourth device group form a transmission abnormality; and if the forwarding rule of the fourth device and the forwarding rule of the sixth device in the fourth device group form a transmission abnormality, the rule obtaining unit obtains a seventh forwarding rule, where the seventh forwarding rule is a forwarding rule obtained after the forwarding rule of the sixth device is calibrated.

Optionally, the identifier information is a fourth identifier and a fifth identifier, and the condition is a communication requirement for a device group identified by the fourth identifier to join a multicast group identified by the fifth identifier;

the network device group obtaining unit is specifically configured to obtain a fifth device group corresponding to the fourth identifier, where the fifth device group includes a device that communicates with a device identified by the fourth identifier;

the network device group obtaining unit is specifically configured to select a seventh device from the fifth device group according to the communication requirement for the device group identified by the fourth identifier to join the multicast group identified by the fifth identifier, where the seventh device communicates with the device group identified by the fourth identifier; and the network device group obtaining unit is specifically configured to obtain information about the seventh device, where the information about the seventh device includes an identifier of the seventh device and an interface of the seventh device.

Optionally, the rule obtaining unit is specifically configured to obtain a third match field and a third action from the condition, where the third match field corresponds to the communication requirement for the device group identified by the fourth identifier to join the multicast group identified by the fifth identifier, and the third action corresponds to a multicast operation; and the rule obtaining unit is specifically configured to generate a forwarding rule of the seventh device according to the third match field and the third action.

Optionally, the rule obtaining unit is further configured to perform a conflict check on the forwarding rule of the seventh device and an eighth forwarding rule, where the eighth forwarding rule is a forwarding rule that is already configured on the seventh device; and if the forwarding rule of the seventh device conflicts with the eighth forwarding rule, the rule obtaining unit is configured to calibrate the forwarding rule of the seventh device, to obtain a calibrated forwarding rule of the seventh device.

Optionally, the rule obtaining unit is further configured to determine whether the forwarding rule of the seventh device and a forwarding rule of an eighth device in the fifth device group form a transmission abnormality; and if the forwarding rule of the seventh device and the forwarding rule of the eighth device in the fifth device group form a transmission abnormality, the rule obtaining unit is configured to obtain a ninth forwarding rule, where the ninth forwarding rule is a forwarding rule obtained after the forwarding rule of the eighth device is calibrated.

Optionally, the apparatus further includes:

a detection packet obtaining unit, configured to obtain a detection packet according to the first forwarding rule and the information about the network device group, where the detection packet is used to obtain a detection result from the network device group, and the detection result is a result of communication that is performed by the network device group according to the first forwarding rule;

a second sending unit, configured to send the detection packet to the controller;

a receiving unit, configured to receive the detection result sent by the controller; and an adjustment unit, configured to adjust the contract according to the detection result when the detection result meets a preset condition.

Optionally, the contract further includes a type of the service, and the type of the service is access, routing, or multicast.

Figure 8:
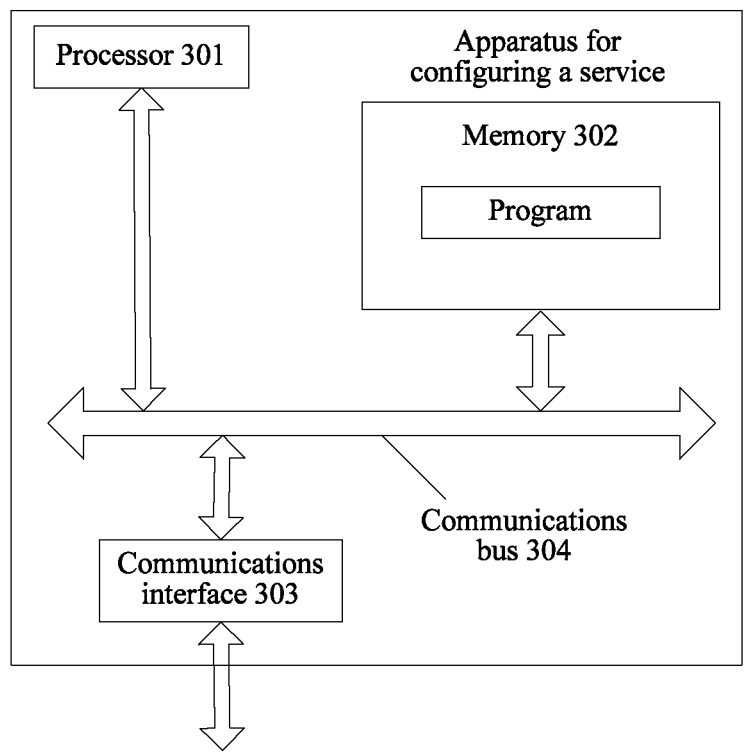
FIG. 8 is a schematic diagram of an apparatus for configuring a service according to an embodiment of the present application.

Correspondingly, an embodiment of the present application further provides an apparatus for configuring a service. The apparatus for configuring a service may be disposed on an Naas device or a Controller, or may be disposed on another device, and details are not described herein example by example. The apparatus for configuring a service may execute the method provided in any one of the embodiments corresponding to FIG. 1 to FIG. 6. As shown in FIG. 8, the apparatus for configuring a service may include: a processor 301, a memory 302, and a communications interface 303. The processor 301, the memory 302, and the communications interface 303 may be connected by using a communications bus 304. The memory 302 is configured to store a program, and the processor 301 executes a specific operation according to an executable instruction included in the program read from the memory 302.

Optionally, the contract obtaining unit 201 and the first sending unit 204 in FIG. 7 may be implemented by the communications interface 303 in FIG. 8, and the communications interface 303 may include at least one physical interface. The network device group obtaining unit 202 and the rule obtaining unit 203 in FIG. 7 may be implemented by the processor 301 in FIG. 8 according to the executable instruction stored in the memory 302, and the processor 301 may include at least one physical processor.

Optionally, the second sending unit and the receiving unit in the embodiment corresponding to FIG. 7 may also be implemented by the communications interface 303 in FIG. 8. The detection packet obtaining unit and the adjustment unit in the embodiment corresponding to FIG. 7 may also be implemented by the processor 301 in FIG. 8 according to the executable instruction stored in the memory 302.

It should be noted that, the apparatus, shown in FIG. 7, for configuring a service and the apparatus, shown in FIG. 8, for configuring a service may be a same apparatus, and it may be considered that FIG. 8 shows, from a physical perspective, content included in an apparatus for configuring a service, and FIG. 7 shows, from a logic perspective, content included in an apparatus for configuring a service.

In the apparatus, shown in FIG. 8, for configuring a service, the processor 301 is configured to read the instruction and data stored in the memory 302 to perform the following operations:

obtaining, by the processor 301, a contract of a service by using the communications interface 303, where the contract includes identifier information and a condition, the identifier information is used to identify a first device group, the first device group includes a device that provides the service, and the condition is a communication requirement corresponding to the service;

obtaining, by the processor 301, information about a network device group according to the identifier information and the condition;

obtaining, by the processor 301, a first forwarding rule according to the condition, where the first forwarding rule corresponds to the network device group; and sending, by the processor 301, the first forwarding rule and the information about the network device group to a controller by using the communications interface 303.

Based on the foregoing descriptions of the implementation manners, a person skilled in the art may clearly understand that all or some steps of the methods in the foregoing embodiments may be implemented by software in addition to a general hardware platform. Based on such an understanding, the technical solutions of the present application essentially or the part contributing to the prior art may be implemented in a form of a software product. The computer software product may be stored in a storage medium, such as a read-only memory (ROM), a random access memory (RAM), a magnetic disk, or an optical disc, and includes several instructions for instructing a computer device (which may be a personal computer, a server, a network communications device such as media gateway, or the like) to perform the methods described in the embodiments or some parts of the embodiments of the present application.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present application without creative efforts.

The foregoing descriptions are merely optional implementation manners of the present application, but are not intended to limit the protection scope of the present application. It should be noted that a person of ordinary skill in the art may make some improvements and polishing without departing from the principle of the present application and the improvements and polishing shall fall within the protection scope of the present application.

What is claimed is:

1. A method for configuring a service, comprising:

obtaining identifier information and a condition, wherein the identifier information is used to identify a first device group, the first device group comprises a device that provides a first service, and the condition is a communication requirement corresponding to the service;

obtaining information about a network device group according to the identifier information and the condition, wherein the network device group comprises a network device satisfying the condition;

obtaining a first forwarding rule according to the condition, wherein the first forwarding rule corresponds to the network device group, and the first forwarding rule is used to enable the network device in the network device group to provide the first service to the device in the first device group; and sending the first forwarding rule, wherein the identifier information comprises a fourth identifier and a fifth identifier, the condition comprises a communication requirement for a device group identified by the fourth identifier to join a multicast group identified by the fifth identifier, and the obtaining information about a network device group according to the identifier information and the condition further comprises:

determining a fifth device group corresponding to the fourth identifier, wherein the fifth device group comprises a device that communicates with a device identified by the fourth identifier;

selecting a seventh device from the fifth device group according to the communication requirement for the device group identified by the fourth identifier to join the multicast group identified by the fifth identifier, wherein the seventh device communicates with the device group identified by the fourth identifier; and obtaining information about the seventh device, wherein the information about the seventh device comprises an identifier of the seventh device and an interface of the seventh device.

2. The method according to claim 1, wherein the identifier information comprises a first identifier, the condition comprises a communication requirement for accessing a device group identified by the first identifier, and the obtaining information about a network device further comprises:

determining a second device group corresponding to the first identifier, wherein the second device group is a backup device group and the second device group comprises a first device, and the first device is a device that meets the communication requirement;

selecting the first device from the second device group according to the communication requirement for accessing the device group identified by the first identifier; and obtaining information about the first device, wherein the information about the first device comprises a device identifier of the first device and an interface of the first device.

3. The method according to claim 2, wherein the obtaining a first forwarding rule according to the condition further comprises:

obtaining a first match field and a first action from the condition, wherein the first match field corresponds to the communication requirement for accessing the device group identified by the first identifier, and the first action corresponds to an access operation; and generating a forwarding rule of the first device according to the first match field and the first action.

4. The method according to claim 3, wherein the obtaining a first forwarding rule according to the condition further comprises one or more of:

when the forwarding rule of the first device conflicts with the second forwarding rule, obtaining a calibrated forwarding rule of the first device;
and
when the forwarding rule of the first device and the forwarding rule of the second device in the second device group form a transmission abnormality, obtaining a third forwarding rule, wherein the third forwarding rule is a calibrated forwarding rule of the second device.

5. The method according to claim 1, wherein the obtaining a first forwarding rule according to the condition further comprises:

obtaining a third match field and a third action from the condition, wherein the third match field corresponds to the communication requirement for the device group identified by the fourth identifier to join the multicast group identified by the fifth identifier, and the third action corresponds to a multicast operation; and generating a forwarding rule of the seventh device according to the third match field and the third action.

6. The method according to claim 5, wherein the obtaining a first forwarding rule according to the condition further comprises one or more of:

when the forwarding rule of the seventh device conflicts with the eighth forwarding rule, obtaining a calibrated forwarding rule of the seventh device;
and
when a transmission abnormality is formed, obtaining a ninth forwarding rule, wherein the ninth forwarding rule is a calibrated forwarding rule of the eighth device.

7. The method according to claim 1, further comprising:

obtaining a detection packet according to the first forwarding rule and the information about the network device group, wherein the detection packet is used to obtain a detection result from the network device group, and the detection result is a result obtained by detecting communication that is performed by the network device group according to the first forwarding rule;

sending the detection packet to a controller;

receiving the detection result sent by the controller; and when the detection result meets a preset condition, adjusting a contract according to the detection result.

8. The method according to claim 1, wherein a contract further comprises a type of the service, and the type of the service comprises access, routing, or multicast.

9. The method according to claim 1, wherein the method is performed by a network as a service (NaaS) device.

10. An apparatus, wherein the apparatus having a network as a service (NaaS) function comprises a processor configured to execute instructions to:

obtain identifier information and a condition, wherein the identifier information is used to identify a first device group, the first device group comprises a device that provides a first service, and the condition is a communication requirement corresponding to the service;

obtain information about a network device group according to the identifier information and the condition, wherein the network device group comprises a network device satisfying the condition;

obtain a first forwarding rule according to the condition, wherein the first forwarding rule corresponds to the network device group, and the first forwarding rule is used to enable the network device in the network device group to provide the first service to the device in the first device group; and send the first forwarding rule, wherein the identifier information comprises a fourth identifier and a fifth identifier, the condition comprises a communication requirement for a device group identified by the fourth identifier to join a multicast group identified by the fifth identifier, and where the processor executes the instructions to:

determining a fifth device group corresponding to the fourth identifier, wherein the fifth device group comprises a device that communicates with a device identified by the fourth identifier;

selecting a seventh device from the fifth device group according to the communication requirement for the device group identified by the fourth identifier to join the multicast group identified by the fifth identifier, wherein the seventh device communicates with the device group identified by the fourth identifier; and obtaining information about the seventh device, wherein the information about the seventh device comprises an identifier of the seventh device and an interface of the seventh device.

11. The apparatus according to claim 10, where the identifier information comprises a first identifier, the condition comprises a communication requirement for accessing a device group identified by the first identifier, and the processor executes the instructions to:

determine a second device group corresponding to the first identifier, wherein the second device group is a backup device group and the second device group comprises a first device, and the first device is a device that meets the communication requirement;

select the first device from the second device group according to the communication requirement for accessing the device group identified by the first identifier; and obtain information about the first device, wherein the information about the first device comprises a device identifier of the first device and an interface of the first device.

12. The apparatus according to claim 11, where the processor executes the instructions to:

obtain a first match field and a first action from the condition, wherein the first match field corresponds to the communication requirement for accessing the device group identified by the first identifier, and the first action corresponds to an access operation; and generate a forwarding rule of the first device according to the first match field and the first action.

13. The apparatus according to claim 12, where the processor further executes the instructions to perform one or more of:

when the forwarding rule of the first device conflicts with the second forwarding rule, obtaining a calibrated forwarding rule of the first device; and when the forwarding rule of the first device and the forwarding rule of the second device in the second device group form a transmission abnormality, obtaining a third forwarding rule, wherein the third forwarding rule is a calibrated forwarding rule of the second device.

14. The apparatus according to claim 10, where the processor executes the instructions to:

obtain a third match field and a third action from the condition, wherein the third match field corresponds to the communication requirement for the device group identified by the fourth identifier to join the multicast group identified by the fifth identifier, and the third action corresponds to a multicast operation; and generate a forwarding rule of the seventh device according to the third match field and the third action.

15. The apparatus according to claim 14, where the processor further executes the instructions to perform one or more of:

when the forwarding rule of the seventh device conflicts with the eighth forwarding rule, obtaining a calibrated forwarding rule of the seventh device; and when a transmission abnormality is formed, obtaining a ninth forwarding rule, wherein the ninth forwarding rule is a calibrated forwarding rule of the eighth device.

16. The apparatus according to claim 10, where the processor further executes the instructions to:

obtain a detection packet according to the first forwarding rule and the information about the network device group, wherein the detection packet is used to obtain a detection result from the network device group, and the detection result is a result obtained by detecting communication that is performed by the network device group according to the first forwarding rule;

send the detection packet to a controller;

receive the detection result sent by the controller; and when the detection result meets a preset condition, adjust a contract according to the detection result.

17. The apparatus according to claim 10, wherein a contract further comprises a type of the service, and the type of the service comprises access, routing, or multicast.

18. A network system comprising an apparatus having a network as a service (NaaS) function, where the apparatus comprises a processor configured to execute instructions to:

obtain identifier information and a condition, wherein the identifier information is used to identify a first device group, the first device group comprises a device that provides a first service, and the condition is a communication requirement corresponding to the service;

obtain information about a network device group according to the identifier information and the condition, wherein the network device group comprises a network device satisfying the condition;

obtain a first forwarding rule according to the condition, wherein the first forwarding rule corresponds to the network device group, and the first forwarding rule is used to enable the network device in the network device group to provide the first service to the device in the first device group; and send the first forwarding rule, wherein the identifier information comprises a fourth identifier and a fifth identifier, the condition comprises a communication requirement for a device group identified by the fourth identifier to join a multicast group identified by the fifth identifier, and where the processor executes the instructions to:

determine a fifth device group corresponding to the fourth identifier, wherein the fifth device group comprises a device that communicates with a device identified by the fourth identifier;

select a seventh device from the fifth device group according to the communication requirement for the device group identified by the fourth identifier to join the multicast group identified by the fifth identifier, wherein the seventh device communicates with the device group identified by the fourth identifier; and obtain information about the seventh device, wherein the information about the seventh device comprises an identifier of the seventh device and an interface of the seventh device.

* * * * *